US012136319B2

(12) United States Patent
Dorris, Jr. et al.

(10) Patent No.: US 12,136,319 B2
(45) Date of Patent: Nov. 5, 2024

(54) COMPUTER-IMPLEMENTED SYSTEMS AND METHODS FOR SECONDARY GAME CREATION AND MANAGEMENT

(71) Applicant: Poarch Band of Creek Indians, Atmore, AL (US)

(72) Inventors: James F. Dorris, Jr., Spanish Fort, AL (US); Kenneth William Rohman, III, Gulf Shores, AL (US); Brian Franklin Bell, Walnut Hill, FL (US); Peter Anderson, Northbrook, IL (US); Ronald E. Nesbitt, Montgomery, AL (US); Peter A. Connelly, Seattle, WA (US)

(73) Assignee: Poarch Band of Creek Indians, Atmore, AL (US)

( * ) Notice: Subject to any disclaimer, the term of this patent is extended or adjusted under 35 U.S.C. 154(b) by 0 days.

(21) Appl. No.: 17/116,947

(22) Filed: Dec. 9, 2020

(65) Prior Publication Data

US 2021/0174643 A1 Jun. 10, 2021

Related U.S. Application Data

(60) Provisional application No. 62/945,823, filed on Dec. 9, 2019.

(51) Int. Cl.
*G07F 17/32* (2006.01)

(52) U.S. Cl.
CPC ...... *G07F 17/3267* (2013.01); *G07F 17/3223* (2013.01); *G07F 17/3272* (2013.01)

(58) Field of Classification Search
CPC ............. G07F 17/3223; G07F 17/3272; G07F 17/3267
See application file for complete search history.

(56) References Cited

U.S. PATENT DOCUMENTS 8,808,077 B1 * 8/2014 Chun .................... G07F 17/323 463/25
2007/0293293 A1 * 12/2007 Baerlocher ......... G07F 17/3211 463/16
2008/0108404 A1 * 5/2008 Iddings ............... G07F 17/3276 463/16

(Continued)

*Primary Examiner* — Chase E Leichliter
(74) *Attorney, Agent, or Firm* — Finnegan, Henderson, Farabow, Garrett & Dunner, LLP

(57) ABSTRACT

Computer-implemented systems and methods for secondary game creation and management include a plurality of gaming machines, and a scheduler configured to initiate a secondary game in response to a request from one or more players or a schedule defined by an administrator, the secondary game including one or more games executed on the plurality of gaming machines. A controller is also provided that is configured to validate each player to participate in the secondary game on respective ones of the plurality of gaming machines and enable secondary gameplay by the validated players on the plurality of gaming machines. Further, a data analyzer is provided that is configured to receive primary game player data and secondary game player data from the plurality of gaming machines and process the primary game player data and secondary game player data to determine at least one of a progression, position, or score of a player of a secondary game.

25 Claims, 11 Drawing Sheets

(56) References Cited

U.S. PATENT DOCUMENTS

| | | | | |
|---|---|---|---|---|
| 2009/0104965 | A1* | 4/2009 | House | G06Q 20/3674 463/20 |
| 2009/0275374 | A1* | 11/2009 | Nelson | G07F 17/3276 463/16 |
| 2009/0280904 | A1* | 11/2009 | Nicely | G07F 17/3276 463/40 |
| 2010/0113162 | A1* | 5/2010 | Vemuri | G07F 17/3267 463/43 |
| 2012/0122561 | A1* | 5/2012 | Hedrick | G07F 17/323 463/25 |
| 2014/0018154 | A1* | 1/2014 | Petersen | G07F 17/3239 463/25 |
| 2015/0199868 | A1* | 7/2015 | Kelly | G07F 17/3225 463/25 |
| 2015/0332537 | A1* | 11/2015 | Chun | G07F 17/323 463/40 |
| 2015/0339879 | A1* | 11/2015 | Brunell | G07F 17/34 463/31 |
| 2019/0035220 | A1* | 1/2019 | deWaal | G07F 17/3227 |
| 2019/0188943 | A1* | 6/2019 | Humphrey | G07F 17/323 |
| 2019/0311579 | A1* | 10/2019 | Hawkins | G07F 17/3227 |
| 2020/0202663 | A1* | 6/2020 | Halvorson | G07F 17/3267 |
| 2021/0097816 | A1* | 4/2021 | Burns | G07F 17/3237 |
| 2021/0174643 | A1* | 6/2021 | Dorris, Jr. | G07F 17/3223 |

* cited by examiner

COMPUTER-IMPLEMENTED SYSTEMS AND METHODS FOR SECONDARY GAME CREATION AND MANAGEMENT

CROSS REFERENCE TO RELATED APPLICATION(S)

This application claims priority to U.S. Provisional Application No. 62/945,823, filed on Dec. 9, 2019, the contents of which is hereby incorporated by reference in its entirety.

TECHNICAL FIELD

The present disclosure generally relates to computer-implemented gaming systems and machines. More particularly, and without limitation, the present disclosure relates to computer-implemented systems and methods for secondary game creation and management.

BACKGROUND

Electronic gaming machines are known that allow users to play individually or against each other in limited and highly configured groups according to tournament play mechanics that are unique to the manufacturer of the underlying games. These gaming machines include a number of components (hardware, software, and/or firmware) to enable users to participate in games and may be located at a physical location, such as a casino or other building where regulated gaming is permitted. These gaming machines often have restrictions in terms of the rules and payout of the enabled games. There are also technological restrictions such as limited game type(s) enabled per gaming machine and the inability to allow players of different underlying games to participate in secondary game(s). Online gaming is also available, but there are restrictions placed on websites that host online games and in some jurisdictions there are regulations that prohibit online bets or wagers.

Tournament-style games exist both online and in casinos. However, players are not able to choose different games for a tournament. For example, in regulated gaming environments, the casino operator or administrator will typically select the underlying game for the tournament and require each player to play the same game as all other participants in the tournament. Additionally, when existing tournament style games are placed into tournament mode, the underlying games cease to play in their normal mode. For example, players in tournament mode no longer wager on the games during tournament mode and existing tournament games use different mathematical models for determining the return to player and/or performance of players. There are technological reasons for some of these restrictions as the designated gaming machines are often limited in terms of which games are implemented and/or licensed for play on the gaming machine.

Also, in the field of electronic gaming, there is no matchmaking system or diverse style of tournament gaming. For example, the inventors of the present disclosure have observed that it would be beneficial to have a matchmaking system that allows players of one underlying game to be paired with players of another underlying game regardless of the physical proximity or geographical location of the electronic gaming machines. In a tournament, for example, such matchmaking would be advantageous and encourage more players to participate in a tournament.

Furthermore, in the field of electronic gaming, the inventors of the present disclosure have observed that it would be advantageous to allow the regulated wager based play continue with the underlying or primary games as players participate in a secondary game, which would likewise encourage more players to participate in the secondary game. It would also be beneficial to provide a technological solution for enabling gaming machines, whether online or in a casino, to play any game type, including those permitted for use in a tournament or other secondary game. The inventors of the present disclosure have also observed the need for systems that can initiate and administer a secondary game in which the progression, position of players, and/or scoring of the secondary game is based on data or the results from each underlying or primary game being played.

SUMMARY

The embodiments of the present disclosure provide improved computer-implemented gaming systems. In addition, the present disclosure provides computer-implemented gaming systems and methods for secondary game creation and management, such as for tournaments and other forms of multiplayer play by using the outputs from multiple single player games. Embodiments of the present disclosure provide technological improvements over extant electronic gaming systems and machines, including those presently used in casinos and other regulated gaming environments.

In some embodiments, a computer-implemented system is provided that includes a plurality of gaming machines, and a scheduler configured to initiate a secondary game according to a schedule defined by an administrator or in response to a request from one or more players, the secondary game comprising one or more games executed on the plurality of gaming machines. The system may also include a controller configured to validate each player to participate in the secondary game on at least one of the plurality of gaming machines and enable secondary gameplay by the validated players on the plurality of gaming machines. The system may also include a data analyzer configured to receive primary game player data and secondary game player data from the plurality of gaming machines and process the primary game player data and secondary game player data to determine at least one of a progression, position of players, or scoring of a secondary game. In some embodiments, the winner of the secondary game is determined based on at least one of primary game scoring and secondary game scoring.

In some embodiments, powerups may be applied by one or more validated players to influence the secondary game, such influence being related to the progression, position of players, and/or scoring of the secondary game. Additionally, in some embodiments, secondary game scoring is determined as a function of at least one of the primary game player data and the primary game scoring.

Still further, in some embodiments, a secondary game may be created or started spontaneously (i.e., without a schedule). The secondary game may be started at random time (e.g., using a random number generated) or in response to request(s) from one or more users of the plurality of gaming machines. Further, players requesting to join a secondary game may be validated before they are permitted to join the secondary game. In some embodiments, the number of players allowed to join a secondary game may be limited.

Additional objects and advantages of the disclosed embodiments will be set forth in part in the following description, and will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
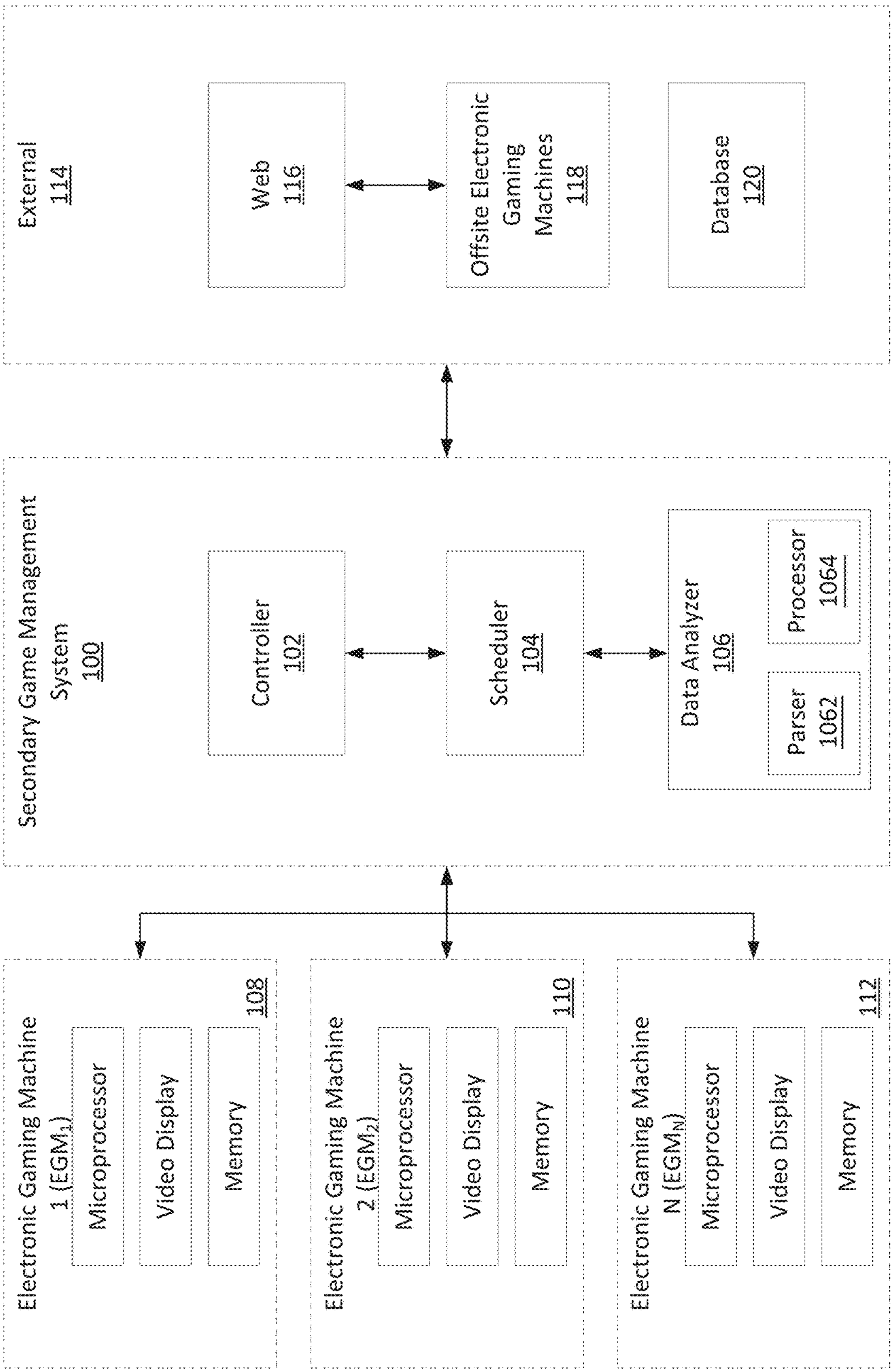
FIG. 1 illustrates an example embodiment of a secondary game creation and management system, consistent with embodiments of the present disclosure.

Reference will now be made in detail to example embodiments which are described below and illustrated in the accompanying drawings. The following description refers to the accompanying drawings in which the same numbers in different drawings represent the same or similar elements unless otherwise represented. The implementations set forth in the following description do not represent all implementations consistent with the present disclosure. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

Modern day electronic gaming machines in a casino or other regulated location often involve players playing a number of different games and the games may or may not be made by the same manufacturer. The players may be playing individual games or playing against each other while participating in the same game. These gaming machines also have technological restrictions, such as being implemented to only play limited game type(s). Also, the inventors of the present disclosure have observed that such gaming machines do not allow players to play, either alone against one or more other players or as a team against one or more other teams, against one another when each player wants to play different underlying games. This restriction also exists for online casino games and other types of electronic gaming environments.

Consistent with embodiments of the present disclosure, computer-implemented systems and methods are provided for creating and managing secondary games. A secondary game may be organized as part of a tournament or other types of game play including other forms of multiplayer play including one player competing with one or more other players and one team competing with one or more other teams. Embodiments of the present disclosure also provide improved electronic gaming machines, including gaming machines, whether online or in a casino, that can execute any of a number of game types, including various forms of multiplayer game types.

An electronic gaming machine, as used herein and also referred to as a gaming machine, may include any electronic device or apparatus for gaming. Examples of electronic gaming machines include but are not limited to electronic Class III slot machine games, electronic bingo machines, electronic racing machines, video poker machines, electronic table game machines, electronically augmented (e.g., virtual-reality or augmented-reality) table games, electronic sweepstakes machines, centrally determined and server-based game machines, or any other electronically aided game machines, whether such aid is to associate wagers placed to specific players or to generate the wagering outcome in situations where wagers are placed and prizes are awarded.

With embodiments of the present disclosure, players may initiate and participate in a secondary game while individually playing different primary games, including primary games of their choice. Consistent with the present disclosure, players may initiate secondary games spontaneously (i.e., without a schedule) and across many different underlying electronic gaming machines. Systems and methods of the present disclosure may process information from the primary game(s) and determine the progression, position of players, and/or scoring in the secondary game. Consistent with the present disclosure, the secondary game need not be based on a singular primary game but may be implemented using a variety of different primary games being played concurrently by players in the secondary game.

In some embodiments, the systems and methods disclosed herein allow players of a primary game to initiate or join a secondary game that is based on the scoring or results of one or more primary games. A player may be able to initiate, join, and/or participate in a secondary game with a plurality of players playing a variety of different primary games. By way of example, a first player at a first electronic gaming machine may initiate a secondary game, and one or more other players at other electronic gaming machines may join and participate in the secondary game initiated by the first player. The progression, position of players, and/or scoring of the secondary game may be based entirely or partially on the scoring of players engaged in one or more primary games. The players may individually play against other players (i.e., player(s) v. player(s)) or they may play against each other in teams (i.e., team(s) v. team(s)). Additionally, or alternatively, the progression, position of players, and/or scoring of the secondary game may be computed based on the scoring or results of the primary game(s) and information related to the secondary game.

By way of example, primary games enabled by the system may include a slot game, bingo game, and/or any other type of game. A player at a gaming machine may select and play a primary game by pulling a lever, hitting a button, or some other method. The secondary game may be different from or the same as a primary game. Additionally, or alternatively, the progression, position of players, and/or scoring of the secondary game may be based on the scoring or results of players of the underlying primary game(s). For example, the progression, position, or scoring of a player of a secondary game may be as based on whether the player won, partially won, or scored in the underlying slot game, bingo game, or other type of primary game. Additionally, the progression, position, or scoring of a player of the secondary game may be based on a spin or other action occurring in the underlying primary game. To illustrate further, if a player is playing a slot game as a primary game, each time the player scored or reached a result in the slot game, a determination of the progression, position, or score of the player in the secondary game would be made based on the score or result achieved in the slot game. Different primary games may have different win rates, probabilities of winning, or scoring metrics. The secondary game may account for these differences so that different players may play different primary games yet compete fairly or relatively evenly in the secondary game.

In some embodiments, there may be options for the configuration of the secondary game. For example, the secondary game may support bracket play such that a set number of players or teams from a first round of the secondary game may advance to a second round of the secondary game based on the scoring of the first secondary game which is in turn based on the scoring of the primary game(s). An even smaller subset of players or teams from the second round of the secondary game may then advance to a third round of the secondary game based on the scoring of the second secondary game which is again based on the scoring of the primary game. In some embodiments, the bracket play may have three rounds of secondary games. In other embodiments, the bracket play may have fewer or many more. In some embodiments, the number of rounds for the secondary game may be predetermined. In other embodiments, the number of rounds for the secondary game may be determined and configured by an administrator of the secondary game. In some embodiments, the number of players or teams that advance to the next round of bracket play may be predetermined. In other embodiments, the number of players or teams that advance to the next round of bracket play may be determined and configured by an administrator of the secondary game. In some embodiments, if the number of players or teams participating in the bracket play is less than the number required for a given round, the bracket play may automatically start in the round associated with the current number of players or teams.

In some embodiments, the options for configuration and play of the secondary game may also include a team of players competing with at least one other team. In some embodiments, the number of teams may be predetermined. In other embodiments, the number of teams may be determined and configured by an administrator of the secondary game. In still other embodiments, the number of teams may be determined based on a number of available teams and/or players during initiation of the secondary game.

FIG. 1 illustrates an example embodiment of a system for secondary game creation and management according to the present disclosure. The number and arrangement of components in FIG. 1 are for purposes of illustration and not intended to be limiting to the embodiments of the present disclosure. As shown, secondary game management system 100 comprises a controller 102, a scheduler 104, and a data analyzer 106. The secondary game management system 100 is configured to connect and relay information between a number (N) of electronic gaming machines 108, 110, and 112 for the purpose of creating and managing secondary game(s). Among other operations, the system 100 may be configured to display various aspects of a secondary game on the electronic gaming machine displays. Electronic gaming machines 108, 110, and 112 may be physically located in one or more casinos or other regulated environment(s). Electronic gaming machines 108, 110, and 112 may be computer-implemented equipment with a combination of hardware, software, and/or firmware components. Electronic gaming machines 108, 110, and 112 may also be provided in various forms (i.e., size, shape, and other specifications). By way of example, forms of electronic gaming machine machines 108, 110, and 112 may include console, upright station/monitor, tabletop, reel or slot machine, handheld, and tablet. The components of electronic gaming machines 108, 110, and 112 may include, for instance, one or more of a monitor or display, a display monitor, a game controller or board (including a processor, a memory, and code), a random number generator, a credit input or payment component, an interface processor/board, and peripherals, including buttons, keys, lights, etc.

In some embodiments, the secondary game management system 100 may be configured to receive, over a network connection, a data feed from each of the N electronic gaming machines 108, 110, and 112. The data feed may comprise data messages through which elements of the player profile and game player data are provided. The data feed may be sent before, during and/or after a game finishes on the electronic gaming machines 108, 110, and 112 and may be used by the secondary game management system 100 or stored on server(s) or database(s) for subsequent consumption by other applications. The data feed may be implemented using game accounting tacking systems supported by the electronic gaming machines 108, 110, and 112. One of ordinary skill will be familiar with the game accounting tracking systems used by most electronic gaming machine manufacturers. For example, these include Scientific Games' ACSC and CMP Casino Management Systems and SDS Slot Management System, IGT's Advantage CMS player tracking system, Konami Synkros management system, Aristocrat's Oasis 360 system. With such game accounting tracking systems or similar tracking systems, the secondary game management system 100 may be configured to receive a data feed, over a network connection, from electronic gaming machines 108, 110, and 112 made by any of a number of electronic gaming machine manufacturers. As further disclosed herein, the received data feed, including player profile information and game player data, may be used by controller 102, scheduler 104, and data analyzer 106 for purposes of secondary game creation and management.

In some embodiments, data analyzer 106 may receive data from a plurality of gaming machines (e.g., electronic gaming machines 108, 110, and 112). For example, the plurality of electronic gaming machines may be used for a primary game, a secondary game, or a combination thereof, and the data received by data analyzer 106 may include any combination of primary game data and/or secondary game data. In some embodiments, data analyzer 106 may receive the data from electronic gaming machines equipped with different data tracking or collection systems (e.g., a system with data telemetry capability) or data formats. For example, in one embodiment, the data tracking systems may include a system with data telemetry capability. In some embodiments, data analyzer 106 may utilize a common protocol to merge, combine, re-format, and/or harmonize data received from different data tracking systems or having different data formats for data analysis.

As shown in FIG. 1, data analyzer 106 includes a parser 1062 for parsing received data and a processor 1064 for analyzing and processing the parsed data. In some embodiments, parser 1062 may receive and parse multiple types of received data. The received data may represent an identification of an electronic gaming machine or a player. For example, parser 1062 may receive and parse an identification (e.g., a serial number or a unique alphanumeric string) of an electronic game machine or a player. In some embodiments, the identification may be associated with a token card or player that is provided when logging in. In addition, parser 1062 may receive and parse event-type data. For example, event data may include data representing a log-in event, a log-out event, or a game-complete event. The log-in event (such as a "card-in" event) may represent that a player logs into an electronic gaming machine (e.g., by inserting an ID card into the electronic game machine or manually entering an ID). The log-out event (such as a "card-out" event) may represent that a player logs out of an electronic gaming machine (e.g., by pulling out an ID card from the electronic game machine or manually exiting a game and/or machine). The game-complete event may represent that a game has been completed. The completed game may be a primary game or a secondary game. The game-complete event may be represented by or associated with data indicating the amount of the wage or bet and the amount or outcome of the game. In some embodiments, the outcome of the game includes data identifying the win amount or results for the completed game. Data parsed by parser 1062 may be analyzed and processed by processor 1064. For example, processor 1064 may process identification data to validate a player. One or more database(s) may be used by processor 1064 to look-up a player profile. Processor 1064 may also process parsed data from the received feeds to determine the progression, position of players, and/or scoring in a secondary game. As disclosed herein, a player's progression, position, or scoring in a secondary game may be dependent on the scoring of outcome of their gameplay in a primary game. It may also be dependent on secondary gameplay and outcomes. By way of example, the player's win amount in a primary game may be multiplied by a predetermined score multiplier to determine the player's progression, position, or scoring in the secondary game. In some secondary games, players of the secondary game may need to complete numerous rounds in one or more primary games before a final score or winner in a secondary game is determined. Examples of secondary games in which players progress or advance based on numerous rounds of gameplay in a primary game include track or race-style games. In a track or race game, players may compete against one another with vehicles or avatars that race and move along a track. All players may have preset base speed and the progression or position of a player's vehicle or avatar may advance based on their gameplay and outcomes in a primary game (e.g., bingo or slots). In some embodiments, a player's vehicle or avatar may increase in speed or position along the track in the secondary game based on the points, scores, or results achieved in the primary game. Higher points, scores, or results in the primary game may provide higher speeds or positions in the secondary game. The relationship between the primary game results and the progression, position, or score in the secondary game may be determined by the data analyzer. For example, the data analyzer may process the gameplay data and apply an algorithm that defines a linear or progressive relationship, or may incorporate a multiplier to convert a player's points, scores, or results in a primary game into data for determining the progression, position, or score of the player in a secondary game. The ultimate winner of the secondary game may be determined by the data analyzer based on the player that first reaches the finish line or a predetermined score or level of play. It will be appreciated from this disclosure that other types of secondary games may be implemented that are based on the points, scores, or results in one or more primary games.

Referring again to FIG. 1, processor 1064 may also analyze and process other parsed data. For example, a bonus round event may be used to influence gameplay in the secondary game, such as giving a boost to player progression. As a further example, card-in and card-out events may be used to designate, substitute, or modify players to a secondary game. The above examples are non-limiting examples and it will be appreciated that other parsed data may be analyzed and processed by processor 1064 to manage the secondary game.

In some embodiments, the secondary game management system 100 is also connected via a network for communication with one or more external devices 114. For example, the secondary game management system 100 may be connected to the web 116 (i.e., the Internet) for the purpose of displaying information from one or more websites on the electronic gaming machines 108, 110, and 112. The secondary game management system 100 may also receive information from one or more websites (e.g., websites accessible via web 116 and implemented with one or more servers) for creating and managing a secondary game. Further, the secondary game management system 100 may be configured to send information about the secondary game to a website for display, such as scores or a livestream of the game feed for a tournament or other form of multiplayer game type, such as team against team. In some embodiments, the secondary game management system 100 may be configured to send and receive information associated with a secondary game from a database 120.

In some embodiments, the secondary game management system 100 may be connected, via a network, to one or more offsite electronic gaming machines 118. For example, the secondary game management system 100 may be configured to send and receive information from one or more offsite electronic gaming machines 118 participating in the secondary game. Offsite electronic gaming machines 118 may include electronic gaming machines that are in different areas of a single casino or may include electronic gaming machines located in multiple different casinos. Additionally, offsite electronic gaming machines 118 may include electronic gaming machines that are not located in a casino, such as in another physical location or one or more mobile or online gaming machines, for example.

Figure 2:
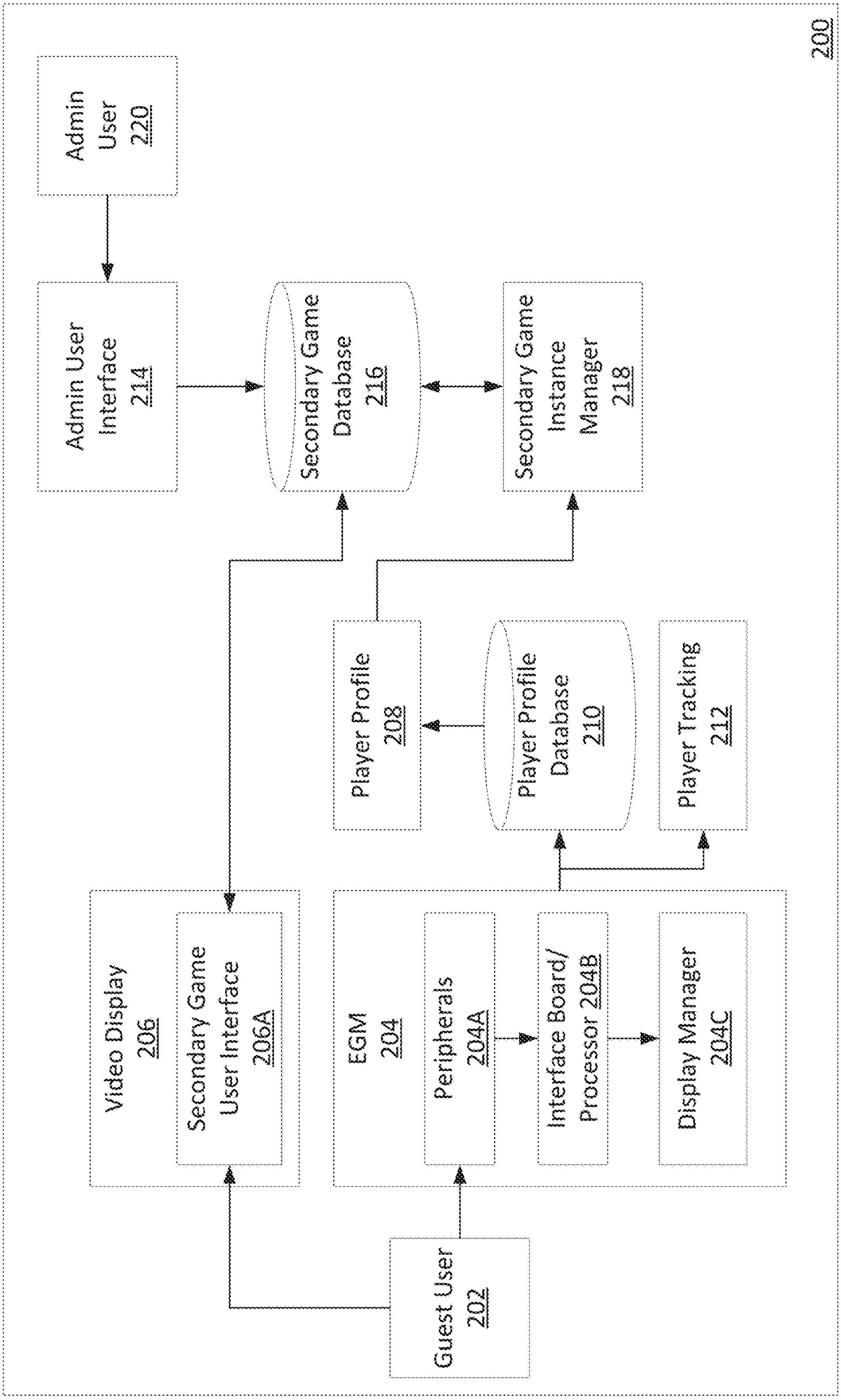
FIG. 2 illustrates another example embodiment of a secondary game creation and management system, consistent with embodiments of the present disclosure.

FIG. 2 illustrates another example embodiment of a secondary game creation and management system, consistent with embodiments of the disclosure. The arrangement and number of components is for purposes of illustration and not limiting for any purpose. The systems and components of FIG. 2 may be connected through any combination of networks. It will also be appreciated, for example, that any number of guests and electronic gaming machines may be used to implement the example embodiment. As shown in FIG. 2, a secondary game management system 200 is provided that includes a guest user 202 interacting with the peripherals 204A of an electronic gaming machine 204 to initiate and drive an underlying game, also referred to herein as the primary game. Peripherals 204A may include one or more buttons, card readers, touch screens, bar code scanners, biometric input devices and/or other peripherals. By way of example, a guest user 202 may validate themselves and/or submit a wager through the peripherals 204A. The peripherals 204A of the electronic gaming machine 204 in turn interact with the interface board/processor 204B and display manager 204C of the electronic gaming machine 204, either of which may send information to a player tracking 212 and/or a player profile database 210. For example, the electronic gaming machine 204 upon receiving validation data and a wager from guest user 202 through peripherals 204A may convert and/or send the received information to player profile database 210. In some embodiments, peripherals 204A may enable a player to initiate and play a secondary game. Additionally, in some embodiments, no wager may be needed from a player to initiate or participate in a secondary game. Wagers submitted for a primary game may be recorded and controlled as a function of the underlying electronic gaming machine 204. Thus, regulated wager-based play activity may continue with the primary game while a player participates in a secondary game.

The player profile database 210 updates the player profile 208 which in turn updates the secondary game instance manager 218. For example, the player profile database 210 may send player validation and/or wager information to or in the form of player profile 208, which in turn is received by secondary game instance manager 218. The secondary game instance manager 218, which may include a controller and other components (e.g., a scheduler and/or data analyzer, not shown in FIG. 2), may send and store such information in the secondary game database 216 for future access and management of secondary games.

In some embodiments, secondary game instance manager 218 may include a component (e.g., a controller or scheduler) for configuring options and rules for the secondary games, and monitoring and controlling network connections to game servers of the secondary games. For example, the component may include a graphical user interface element (e.g., a control panel) displayed on a screen of the scheduler 104 of FIG. 1 to allow an administrator to configure options and rules. The configurable options may include a time period before a secondary game starts for accepting joining players, a time length for an opening ceremony of the secondary game, a time length of a game session, a time length for a closing or prize ceremony of the secondary game, a score multiplier for multiplying a score of a winning player, or the like. The rules may include a duration of the secondary game, a scoring scheme of the secondary game (e.g., a single-round or multi-round scoring scheme), the number of players of the secondary game, whether players of a secondary game need to use game tokens associated with their player profiles for joining or initiating the secondary game, whether special effects (e.g., freezing, shielding, or interfering with other players) are allowed in the secondary game, whether powerups are allowed to be used in the secondary game, whether access to the secondary game is restricted for some players, whether the players are allowed to request prizes, whether simulated players (e.g., artificial intelligence players created by the game server) participate the secondary game, or the like. Rules can also be set for determining an outcome of a secondary game based on the data received and parsed by analyzer 106. For example, the rule can set the multiplier or scoring for players of the secondary game based on whether the primary game is in a bonus round and/or based on the levels of the players. In some embodiments, secondary game instance manager 218 may also allow configuration of options for a live streaming service of the secondary game or other network connection parameters, monitoring usage statuses and geological locations of electronic gaming machines.

In some embodiments, the player profile 208 or a copy thereof may be stored on the secondary game database 216. The secondary game database 216 may also receive and store instructions from an administrator user 220 through an administrator user interface 214 to drive a secondary game. The instructions and other input may be used by secondary game database 216 to initiate and manage secondary games. By way of example, administrator user 220 may provide input via administrator user interface 214 to schedule a secondary game by date, time, and/or location. Administrator user 220 may also provide input to set parameters for the secondary game, such as the permitted game type(s) and availability of powerups. The secondary game instance manager 218 also interacts with the secondary game user interface 206A through a video display 206. For example, the secondary game instance manager 218 may send leaderboard updates for display to the secondary game user interface 206A through video display 206. Video display 206 may be located with or proximate to electronic gaming machine 204. Through video display 206 (e.g., touch screen capabilities in secondary game user interface 206A) and/or peripherals 204A, guest user 202 may request initiation of a secondary game or provide other inputs (such as a request to participate or join a secondary game), that are conveyed to secondary game instance manager 218. Also, in some embodiments, because the primary game may be played multiple times in a single instance of the secondary game, guest user 202 may send multiple wagers to electronic gaming machine 204 using peripherals 204A as the primary game is repeatedly played. The transfer of information described above may happen many times during a single session of the secondary game. Furthermore, secondary game management system 200 may monitor the inputs (such as through secondary game user interface 206A and/or peripherals 204A) and data feeds (such as through player tracking 212) from each participating electronic gaming machine 204. The inputs and feeds are then used to drive player progression, position, and/or scoring of the secondary game by the secondary game management system 200.

Figure 3:
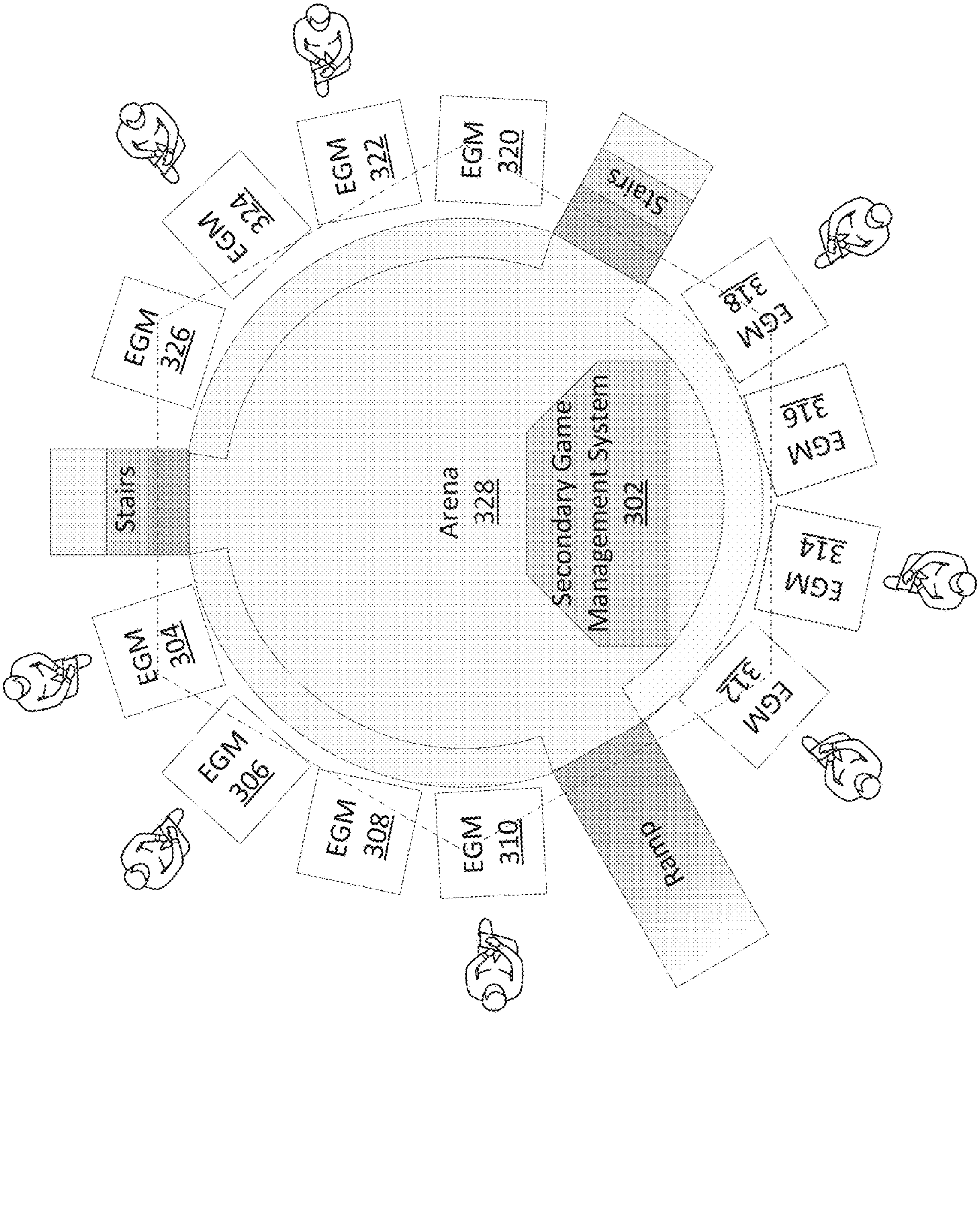
FIG. 3 illustrates an example environment for a secondary game creation and management system, consistent with embodiments of the disclosure.
Figure 4:
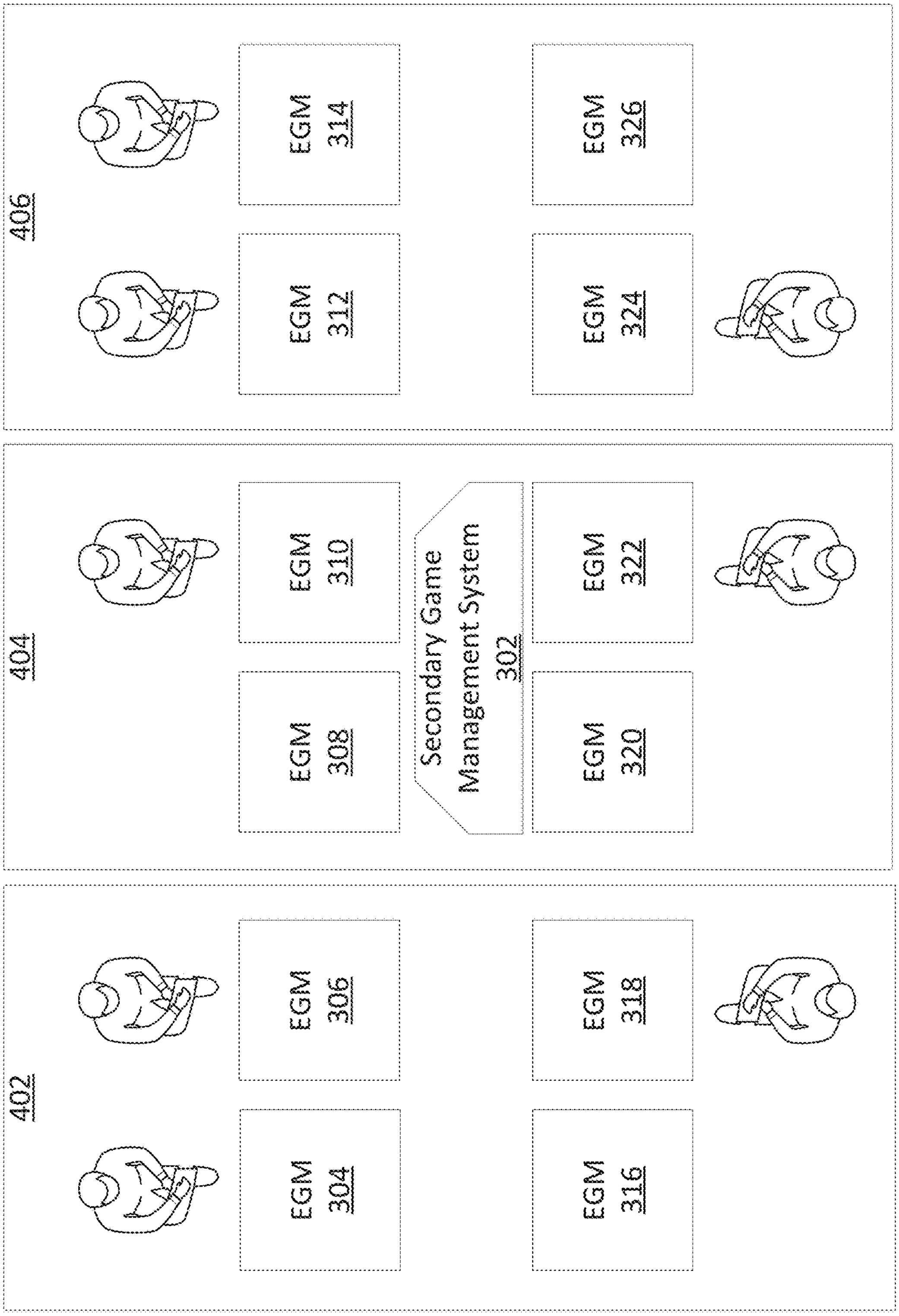
FIG. 4 illustrates another example environment for a secondary game creation and management system, consistent with embodiments of the disclosure.
Figure 5:
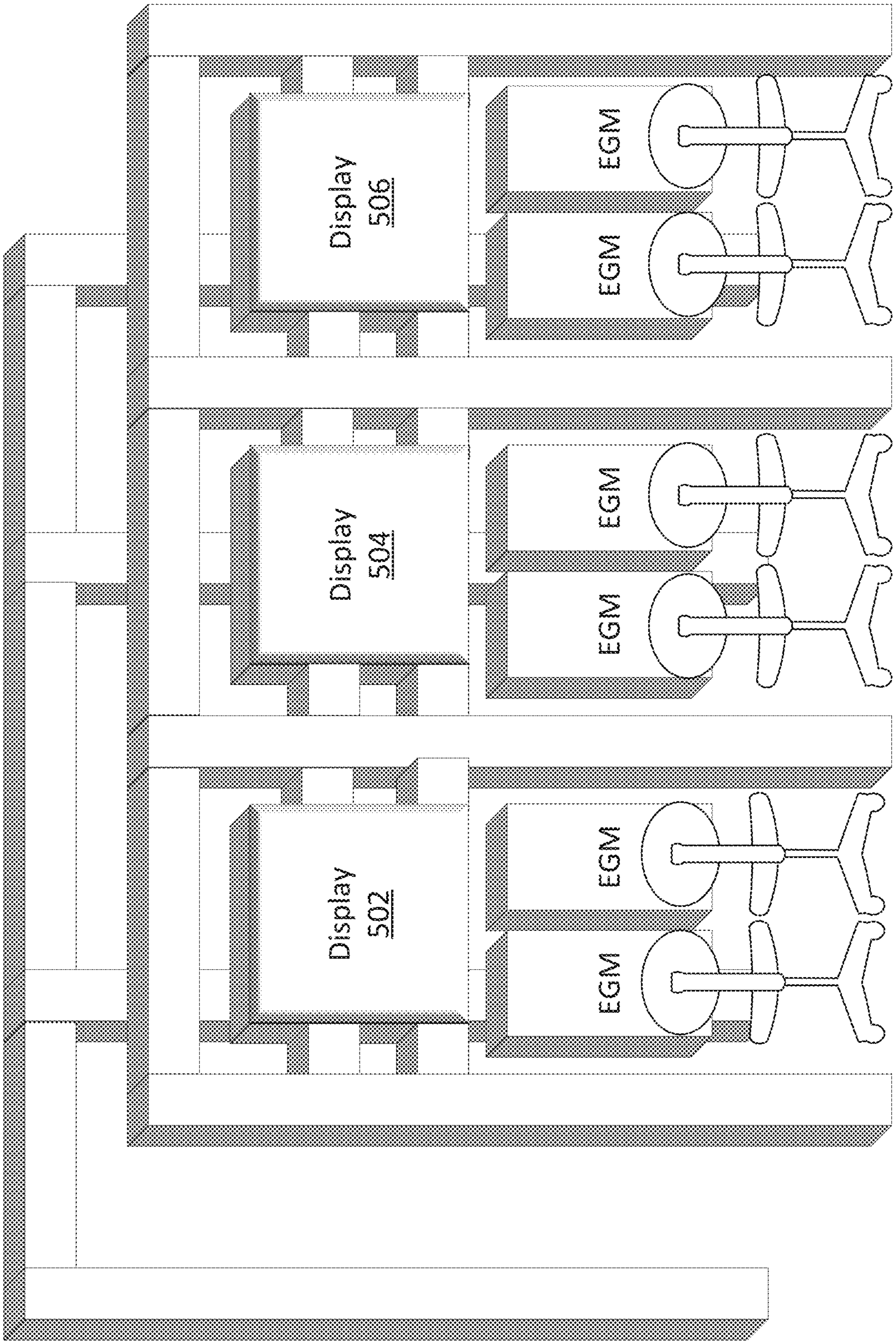
FIG. 5 illustrates another view of an example environment for a secondary game creation and management system, consistent with embodiments of the disclosure.

FIGS. 3, 4, and 5 illustrate environments for an example secondary game creation and management system, such as secondary game management system 100 or 200. These figures are meant to be non-limiting and represent only aspects of embodiments of the present disclosure. Also, it will be appreciated, that the components and systems of these embodiments may be connected through any combination of networks.

As shown in FIG. 3, a plurality of electronic gaming machines 304, 306, 308, 310, 312, 314, 316, 318, 320, 322, 324, and 326 are provided for participating in a secondary game. The electronic gaming machines 304-326 may be arranged on a casino floor around a designated arena 328. In some embodiments, there may be one or more such arenas staged in a casino or across multiple casino locations. By way of example, the arena 328 may have an elevated stage (not shown in FIG. 3) and one or more ramps and stairs may be provided for access to the arena. In some embodiments, a live attendant or host may be on the arena for announcements during a tournament or playing of a secondary game. As depicted in FIG. 3, the secondary game management system 302 may be physically located, in-part or whole, in proximity to the electronic gaming machines 304, 306, 308, 310, 312, 314, 316, 318, 320, 322, 324, and 326, participating in the secondary game. Parts of the secondary game management system 302 may also be located not in near physical proximity to the electronic gaming machines 304, 306, 308, 310, 312, 314, 316, 318, 320, 322, 324, and 326. As shown in FIGS. 3 and 4, one or may gaming machines may be vacant and therefore not including a player participating in a secondary game, such as electronic gaming machines 308, 316, 320 and 326. Furthermore, machines that are not vacant (e.g., electronic gaming machines 312 and 322) may not participate in a secondary game, although the players at such machines may be engaging in other games.

By way of further example, one or more video displays of the secondary game management system 302 may be located in near physical proximity to the arena and electronic gaming machines, while other components such as the supporting modules and server components, are in network communication but located elsewhere. The arena 328 may be configured in different layouts as illustrated in FIGS. 3 and 4.

As shown in FIG. 4, one or more of electronic gaming machines 304, 306, 308, 310, 312, 314, 316, 318, 320, 322, 324, and 326, participating in a secondary game may be configured in groups of four electronic gaming machines, such as groups 402, 404, and 406 or in any other interval or grouping. These groups may be physically located in the same floor area of a casino or they may be placed in separate areas or locations with the same casino or across multiple casinos. A communication network (not shown in FIG. 4) may support the transfer of data, inputs, and instructions between the electronic gaming machines 304-326 and the secondary game management system 302. In some embodiments, more electronic gaming machines, may be incrementally added with no upper boundary. Additionally, there may be panels and lights above the electronic gaming machines reflecting the status of the secondary game, such as displays 502, 504, and 506, as shown in FIG. 5. Furthermore, the secondary game system may use a portion of the video display screen(s) of the underlying electronic gaming machines for secondary game initiation, management, and status display, which may have touch screen capabilities.

FIG. 5 depicts another view of the environment depicted in FIG. 4. As shown in FIG. 5, there may be displays 502, 504, and 506 above a pair of electronic gaming machines. A display and/or an electronic tablet may also be located adjacent to each electronic gaming machine. These displays and/or tablets (or another input device) 502, 504, and 506 may be paired with the electronic gaming machines such that they reflect the status of the secondary game associated with the electronic gaming machines individually, in groups, or for all electronic gaming machines. The displays 502, 504, and 506 may show relevant information to the primary game(s) involved in the secondary game and/or the players associated with the electronic gaming machines.

Figure 6:
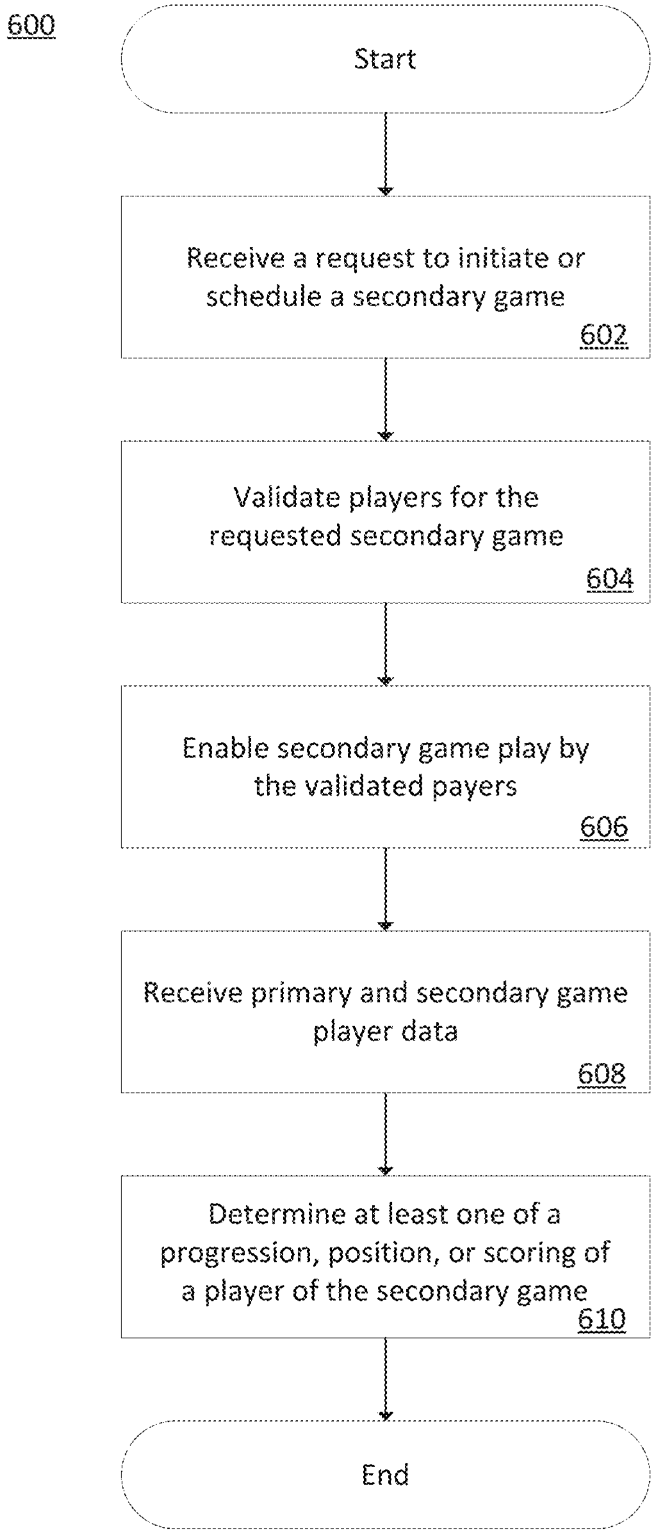
FIG. 6 illustrates a flowchart for an example method of secondary game creation and management, consistent with embodiments of the disclosure.

FIG. 6 illustrates a flowchart for an example method 600 of secondary game creation and management, consistent with embodiments of the present disclosure. The method of FIG. 6. may be implemented with any of the herein disclosed secondary game management systems (see, e.g., FIGS. 1 and 2). Generally, as shown in FIG. 6, the steps of the method 600 include: receiving a request to initiate or schedule a secondary game (step 602), validating players for the requested secondary game (step 604), enabling secondary gameplay by the validated players on a plurality of gaming machines (step 606), receiving primary and secondary game player data (step 608), and determining at least one of a progression, position, or scoring of a player of the secondary game (step 610).

In step 602, the secondary game creation and management system, such as secondary game management system 100, may receive a request to initiate or schedule a secondary game. For example, the secondary game creation and management system may receive a spontaneous request from one or more players, such as guest user 202 of electronic gaming machine 204 to initiate a secondary game. In some embodiments, when a player requests to initiate a secondary game, the system may set a time window (e.g., 30 seconds) for letting other players join the secondary game. In some embodiments, a predetermined number of players may be allowed to join and play in the secondary game. When the number of players is limited, the secondary game may start once the allowed number of players have joined the game. Additionally or alternatively, the system may receive input from an administrator, such as administrator user 220, for setting the date, time, and location(s) (if applicable) for a secondary game to take place. When a secondary game scheduled by an administrator is announced, players may request to join the game. As disclosed, the secondary game creation and management system may include components, such as a scheduler, for receiving secondary game requests and scheduling the same, either spontaneously or according to an administered schedule. The request for a secondary game may include one or more parameters for the secondary game, such as the game type (e.g., player versus player or team versus team), player or team restrictions, participating games, specific versions or types of participating games, scoring methodology, length of opt-in period, permitted locations, etc. In some embodiments, one or more of the parameters may be preset and/or not selectable to the player requesting the secondary game. Further, in some embodiments, an administrator may have the ability to set parameters for secondary games, whether scheduled or open to initiation by players. Still further, in some embodiments, a player may be given the option to select only certain parameters (e.g., game type and participating games).

In some embodiments, the secondary game creation and management system, such as secondary game management system 100, may automatically schedule and manage a plurality of secondary games. For example, a scheduler module (e.g., scheduler 104 in system 100) of the system may schedule secondary games periodically (e.g., every two hours). As another example, the scheduler module may randomly schedule and initiate secondary games in a non-periodic manner, such as by using a random number generator to determine the starting time of each secondary game.

In some embodiments, the secondary game creation and management system may initiate and manage multiple secondary games simultaneously or in parallel. Each initiated secondary game may have a set number of players that use different gaming machines. Also, each of the secondary games may be initiated either in response to a player request, an administrator request, or a schedule (periodic or randomized) by the system. The secondary games and their outcomes are then managed by the system.

In step 604, the secondary game creation and management system, such as secondary game management system 100, may validate the players of a secondary game. Players that wish to join or participate in a secondary game may do so through their respective electronic gaming machine. In some embodiments, there may be restrictions on which players may qualify to participate in a secondary game. Information in a player's profile and/or selected parameters for a secondary game may be used for this purpose. For example, a controller of the secondary game creation and management system (such as controller 102) may communicate over the web, such as web 116 with servers to determine whether a player profile associated with a player of an electronic gaming machine, such as guest user 202 of electronic gaming machine 204, qualifies to participate in the secondary game. In some embodiments, the secondary game creation and management system may validate a player of a secondary game based on that player redeeming tokens associated with their player profile. In some embodiments, the secondary game creation and management system validating a player may trigger a notification to players of other electronic gaming machines that a secondary game is beginning and provide them the option to join. In some embodiments, the secondary game creation and management system may validate a player not associated with a player profile (e.g., a new player or visitor to a casino) and allow them to join.

In some embodiments, the validation of players by secondary game creation and management system may trigger or cause an opt-in period to be applied. The opt-in period may be defined by a countdown period during which players of other electronic gaming machines may opt-in to join an upcoming secondary game. During the opt-in period, players of other electronic gaming machines may receive, for example, notice of the upcoming secondary game, the designated award for winning the secondary game, an option to participate in the secondary game, and a countdown timer showing the time remaining for joining the secondary game. When the countdown is finished and the opt-in period has ended, the secondary game creation and management system may prevent any further players from joining the secondary game and move on to the next step to enable secondary gameplay for the validated players.

In some embodiments, the validation of a player of a secondary game may also include validating the electronic gaming machine associated with the player of the secondary game. For example, a controller of the secondary game creation and management system (such as controller 102) may communicate over the web, such as web 116 with servers to determine whether an electronic gaming machine, such as electronic gaming machine 204, qualifies to participate in the secondary game. In some embodiments, validation of an electronic gaming machine may depend upon the primary games the particular electronic gaming machine is designed to play.

In step 606, the secondary game creation and management system, such as secondary game management system 100, may enable secondary gameplay by validated players for the secondary game. Validated players may play in a secondary game through their respective electronic gaming machine. During secondary gameplay, each player may be informed about the progress of the secondary game, including the positions and/or scoring of other players. The allotted and remaining time (or alternative metric) for a secondary game may also be displayed to each participating player on their respective electronic gaming machine or a video display proximate thereto.

As part of step 606, scheduler 104 may generate a start time and stop time for the secondary game, which may be specific times or relative times depending on, for example, once the secondary game is initiated or when a specific number of players agree to participate. The start and stop times may be used by controller 102 to regulate the data provided to or processed by data analyzer 106. For example, in some embodiments, the secondary game management system 100 may not receive or process player data before the start time and after the end time of the secondary game. Additionally, a controller (such as controller 102) of the secondary game creation and management system sends instructions to the electronic gaming machines of the players validated to participate in the secondary game, such as the players associated with electronic gaming machines 108, 110, and 112, to enable and manage the secondary game. As part of this activity, the controller of the secondary game creation and management system may initiate a data flow as shown in FIG. 2 to allow the electronic gaming machines to communicate with the secondary game creation and management system for the purpose of running the secondary game and receiving game player data.

In some embodiments, a controller (such as controller 102) may disqualify a player from a secondary game based on the start and stop time provided by a scheduler (such as scheduler 104). For example, if a player of an electronic gaming machine, such as guest user 202 of electronic gaming machine 204, begins the primary game before the secondary game has begun, the controller may disqualify the player from the secondary game and discard associated scores or placement. Alternatively, if a player begins the primary game before the secondary game has begun, the controller may discard or remove scores associated with the premature gameplay without disqualifying the player, such that only gameplay from the start time is applied for scoring the secondary game. In still further embodiments, for purposes of scoring the secondary game, the controller may only accept scores received within the start and stop times of the secondary game. It will be appreciated that the above principles may also applied to the progression or position of a player in a secondary game.

In some embodiments, the secondary game is presented as a video overlay on the electronic gaming machines of the validated players to display the scores and gameplay from the primary game in an alternative way while also showing the progress of other players of the secondary game. The video overlay may be instructed and applied to all electronic gaming machines of players participating in the secondary game and may be determined by the secondary game creation and management system.

In step 608, the secondary game creation and management system, such as secondary game management system 100 may receive game player data associated with the primary game(s) and the secondary game. In some embodiments, player data for the primary and secondary games may be received through the tracking systems of the electronic gaming machines associated with the validated players. Also, as part of step 608, player profile information may be received and processed by the secondary game creation and management system. For example, the secondary game creation and management system may receive data associated with each player participating in the secondary game, such as player profile 208. The player profile may include information permitting secondary game interactions, referred to herein as powerups, that are available to the player of the secondary game (as explained in more detail below). Additionally, or alternatively, the secondary game creation and management system may receive information relating to the player's progress in the secondary game, such as player scores, speed, or position.

Powerups may be available to users to affect play in the secondary game. They may be awarded based on online activities, such as social gaming activities, or based on activities on premises, such as underlying electronic gaming machine play or any other reward mechanisms. Powerups may be awarded individually or in groups and may also be gifted from one users to one or more other users. In some embodiments, powerups available to the player may comprise powerups relating to the secondary game which may affect secondary gameplay for one or more players of the secondary game. Powerups may also include a power up to generate a score multiplier for the secondary game for one or more players, which may increase or decrease their scoring, position, and/or progression. The score multiplier may be limited to certain amount of time, certain amount of plays, or random amounts of time or plays in the underlying game. In some embodiments, powerups may include a powerup to enable one or more players of the secondary game to share scoring or wins amongst themselves. The sharing may be limited to a certain amount of time, certain amount of plays, or random amounts of time or plays in the underlying game. In some embodiments, powerups may include a powerup to enable one or more players of the secondary game to choose one or more other players of the secondary game and cause them to stop being able to play for a set period of time, or in another embodiment the top five players (other than the player using the powerup) may be caused to stop being able to play for a set period of time. For example, the powerup may cause the input from the electronic gaming machine of the chosen player(s) to the secondary game to freeze, preventing them from playing or earning scores on the secondary game even though the underlying primary game may continue to play. If the player wins on the underlying primary game at this time, that win would still occur, but they would not receive any scoring or progression in the secondary game while the freeze remains. Alternatively, the powerup may cause a chair of the electronic gaming machine to pull back and not allow the player to reach the controls. In some embodiments, there may also be powerups that may shield or block another player from using a powerup. For example, a player may have a powerup that renders a freeze against them useless. The descriptions above are meant solely as examples and there may be many more powerups designed to alter the gameplay of the secondary game in a predefined way.

In some embodiments, powerups and other inputs to the secondary game may be made through an interface (e.g., an interface of an electronic gaming machine) external to the primary game, such as a controller, keypad, or other input device or peripheral. As another example, input may be made through an application or website on the player's personal device, such as a smart phone, tablet, personal computer, laptop, or other device. Alternatively, a tablet, smart screen, or other peripheral may be provided with such an application or website interface. The tablet, smart screen, or other peripheral may be correlated to the associated electronic gaming machine, such as by administrator user 220, based on hardware (e.g., MAC address), user interface of the application on the device, a combination thereof, or through another method. For example, the tablet, smart screen, or other peripheral may be mounted on a physical supporting device (e.g., a bracket attached on an end of a gooseneck) that is connected to an associated electronic gaming machine directly or indirectly. Furthermore, input may be made through an interface to the underlying electronic gaming machine's displays.

In step 610, the secondary game creation and management system, such as secondary game management system 100, may determine at least one of a progression, position, or score of a player of the secondary game. In some embodiments, the scoring or results of the player in a primary game is used to determine the progression, position, and/or score of the player in the secondary game. Further, the gameplay in the secondary game (e.g., scoring or results) may influence, together with primary game data, the progression, position, or score of the player in the secondary game. Still further, the system may determine a winner of the secondary game based on data or results from the primary and secondary games. For example, a data analyzer module (e.g., data analyzer 106) of the secondary game creation and management system may use the game player data received in the previous step to determine that one or more players associated with the secondary game has won. In some embodiments, the secondary game creation and management system may determine that one or more players have won based on the player scores associated with one or more primary games and/or the secondary game. In some embodiments, the secondary game creation and management system may determine that one or more players have won based on the player scores associated with the one or more primary games and various powerups used during the secondary game. In some embodiments, the scores analyzed by the analytics module may be presented to the controller of the secondary game creation and management system to determine the final winner of the secondary game. Further, consistent with the present disclosure, the secondary game may be part of a live tournament hosted at a casino or other physical location.

In some embodiments, the data analyzer processes the received primary game player data and secondary game player data from the plurality of gaming machines and process the primary game player data and secondary game player data to determine the progression, position, and/or score of players of the secondary game based on at least one of primary game scoring and secondary game scoring. In some embodiments, powerups may be applied by one or more validated players to influence the outcome or scoring of the secondary game. Additionally, in some embodiments, the secondary game scoring is influenced by at least one of the primary game player data and the primary game scoring.

In some embodiments, the secondary game scoring is influenced by the primary game scoring in that winning one or more rounds in the primary game gives points, scores, or advancement for the secondary game. For example, there may be 10 players participating in a secondary game that lasts 10 minutes. A data analyzer module (e.g., data analyzer 106) of the secondary game creation and management system may monitor each electronic gaming machine associated with each player and note wager and win mechanics in each primary game. By way of example, each $1 win of the primary game may equate to 100 points in the secondary game. Depending on the game style or format of the secondary game, the points may be applied to a score, position, or progression (e.g., speed or movement) of the player of the secondary game. At the completion of the 10 minutes of secondary gameplay, the player who accumulated the most secondary game points, score, position, or other progression will win the secondary game.

In some embodiments, the secondary game scoring is influenced by the primary game scoring and primary game player data. The primary game player data may include powerups that the associated player bought, won, received as a gift, etc. For example, there may be 10 players participating in a secondary game that lasts 10 minutes. A data analyzer module (e.g., data analyzer 106) of the secondary game creation and management system may monitor each electronic gaming machine associated with each player and note wager and win mechanics. As in the above example, each $1 win of the primary game may equate to 100 points in the secondary game. However, a player of the secondary game may have a two times multiplier powerup associated with the player's primary game player data. Upon using this powerup, each $1 win of the primary game would therefore equate to 200 points in the secondary game. This allows the player with the two times multiplier powerup to accumulate points faster than the other players of the secondary game.

In some embodiments, the data analyzer may monitor identifications and event data from the gaming machines to control and manage players in a secondary game. For example, the received data may identify a first player when that player logs into the system. In some embodiments, the secondary game creation and management system may permit player replacement during the execution of a secondary game. For example, when the first player leaves a game by logging out (e.g., pulling out an ID card or manually exiting the game or gaming machine), the secondary game creation and management system may provide a time window (e.g., 30 seconds) for a second player to log into the same electronic gaming machine (e.g., by inserting a new ID card or identification) and complete the rest of the secondary game in place of the first player. Additionally, or alternatively, when the second player logs-in at the gaming machine previously used by the first player, the system may give the second player the option to request or join a new secondary game.

In some embodiments, the data analyzer of the secondary game creation and management system may also determine the progression and position of players of the secondary game based on data received from the gaming machines of the players. For example, data analyzer 106 may parse and process data from the electronic gaming machines, which may have different data tracking systems or data formats, to determine the progression and ultimate winner of the secondary game. Data analyzer module 106 may parse and process data received from electronic gaming machines, including data related to primary and secondary games, to determine the progression and winner of the secondary game.

By way of example, data analyzer 106 may determine the progression or score of a player in a secondary game by applying a multiplier (e.g., 100) to the player's outcome in a primary game. The multiplier may be a predetermined amount (e.g., set by an administrator) and fixed throughout the gameplay of a secondary game thereby providing a constant or linear relationship (e.g., increasing outcomes in the primary game cause increasing progression or outcomes in the secondary gamer). In some embodiments, the multiplier may be variable and data analyzer 106 may determine the multiplier associated with a player based on an action of the player in the primary or secondary game. For example, if the secondary game is a racing game, the data analyzer module may increase the multiplier (e.g., from 100 to 200) if the player completes a particular move (e.g., a spin of a vehicle controlled by the player) or milestone in the secondary game. As another example, if the secondary game is an arcade-type game (e.g., a fighting game), the data analyzer module may increase the multiplier if the player completes a combo hit or other move. It will be appreciated that these are non-limiting examples and that other types of multiplier adjustments may be made based on events in other types of the secondary games (e.g., bingo gamers, card games, social games, etc.).

Figure 7:
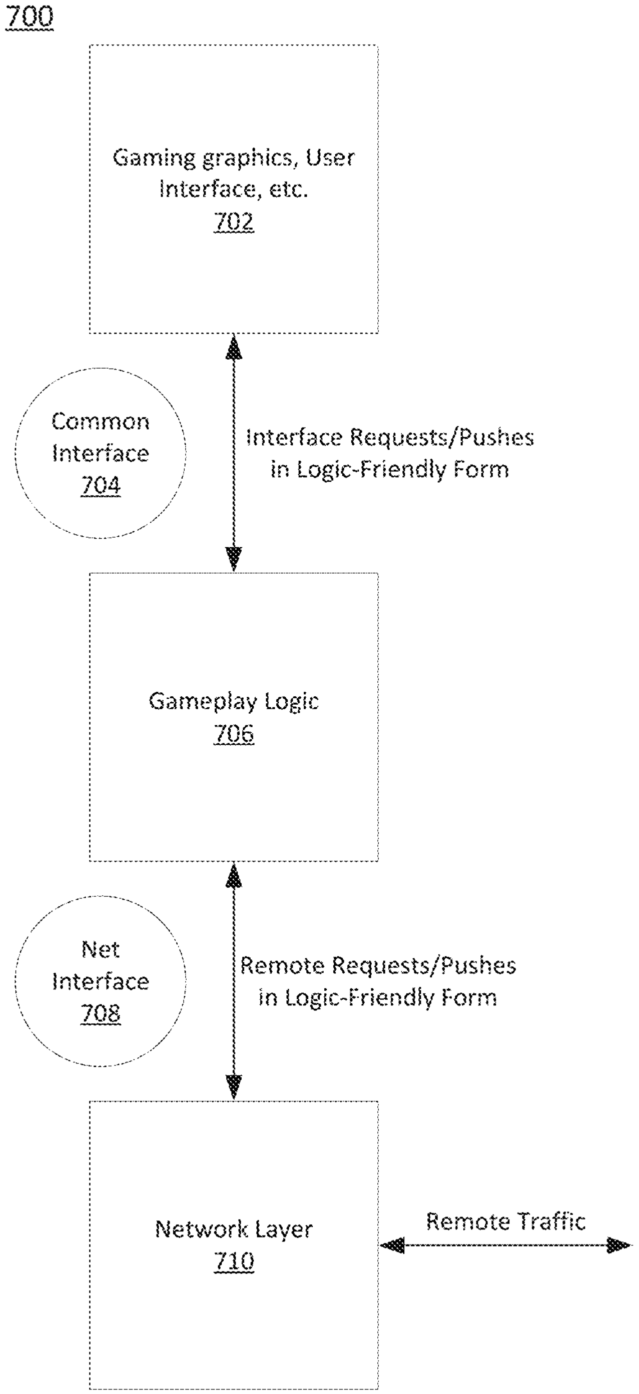
FIG. 7 illustrates a diagram of example application layers for a secondary game creation and management system, consistent with embodiments of the disclosure.

FIG. 7 illustrates a schematic diagram 700 of the application layers for administrator servers, gameplay clients, spectacle clients, and matchmaking servers of an example secondary game creation and management system, such as secondary game management system 100. The application layers comprise a low-level network layer 710, a high-level gameplay logic layer 706, and a player-facing cosmetics/interface layer 702.

The low-level network layer 710 of associated devices, including one or more administrator servers, gameplay clients, spectacle clients, and matchmaking servers, may enable the secondary game creation and management system, such as secondary game management system 100 to find and connect to applications and send and receive network packets containing game information. The network layer 710 may interface with network layers of remote applications and with a well-defined network interface 708 with the high-level gameplay logic layer 706 of the application.

The network layer 710 of the administrator server may be the network hub of the entire secondary game creation and management system, such as secondary game management system 100. The network layer 710 of the administrator server manages external connections to gameplay clients, spectacle clients, electronic gaming machine streams, and remote servers. In the present disclosure, spectacle clients may be software or physical devices and combinations thereof that allow one or more players or non-playing observers to see the progression of the secondary game. In some embodiments, spectacle clients are observers and incapable of affecting the state of any observed game. Spectacle clients may include, for example, large TV-like monitors, tablets, smartphone displays, projection displays, ticker type displays, and other common electronic displays where one or more people may observe. In the present disclosure, gameplay clients may be a representation of the secondary game that appears on a spectacle client built, for example, with the intent of the audience being the one who is playing the game. Gameplay clients therefore include both display and interaction elements. For example, the external connections may include connections to remote servers and remote electronic gaming machines, such as offsite electronic gaming machines 118. The network layer 710 of the administrator server may be configured to open connections to all or some of the remote partners (if there are any). The network layer 710 of the administrator server may be able to recognize gameplay clients and spectacle clients joining the secondary game and disconnecting from the secondary game spontaneously. It may also be able to send and receive packets as defined by the network protocol internal to the secondary game creation and management system, such as secondary game management system 100. The network layer 710 of the administrator server may also be able to receive packets as defined by the network protocol of the electronic gaming machine data system. It may also be able to find a matchmaking server and connect to it as well as handle losing the connection to the matchmaking server without breaking the existing game session. The network layer 710 of the administrator server may be able to turn all of the above-mentioned incoming packets into function calls for the common layer.

The network layer 710 of the gameplay and spectacle clients may be configured to seek out and join the matchmaking server and to send and receive messages from the matchmaking server. It may also join the administrator server such that there is a connection established between the clients and the administrator server, and send and receive messages from the administrator server when instructed to by the matchmaking server. The network layer 710 of the gameplay client may also inform the gameplay logic layer 706 when losing connection to the administrator server or matchmaking server and subsequently attempt to rejoin the administrator server or matchmaking server. The network layer 710 of the gameplay client may be configured to receive network packets from an administrator server and subsequently decode and unpack the packets into score updates or other updates for players. The network layer 710 may then turn the decoded and unpacked packets into an array of values matching player identifications. The network layer 710 may then call a function via the network interface 708 to send score updates with data to the gameplay logic layer 706.

The network layer 710 of the matchmaking server may be configured to handle connections and disconnections from various applications. It may also receive, start, join, or leave requests from various clients associated with the secondary game. The network layer 710 of the matchmaking server may also send setup data to clients to allow them to join a secondary game.

The high-level gameplay logic layer 706 also known as the gameplay logic layer 706 of associated devices, including administrator servers, gameplay clients, spectacle clients, and matchmaking servers, may be able to run the gameplay systems and make high-level logical decisions relevant to the secondary game creation and management system, such as secondary game management system 100. One of ordinary skill in the art will recognize this layer as the gameplay logic layer 706 containing gameplay logic without requiring cosmetic features. The gameplay logic layer 706 may interface with the network layer 710 as described above through a network interface 708. The gameplay logic layer 706 may also interface with the player-facing cosmetics/interface layer 702 through a common interface 704.

The gameplay logic layer 706 of the administrator server includes the associated secondary game state, such as time remaining in the secondary game, players participating in the secondary game, player scores for the secondary game, etc. Additionally, the gameplay logic layer 706 may include a copy of player inventories. For example, player inventories may include the powerups explained above or tokens or other items that enable a player to join or start a secondary game. The gameplay logic layer 706 may manage the update loop of the game as driven by an internal tick loop, the player-facing cosmetics/interface layer 702, and the feed of the associated electronic gaming machines, such as electronic gaming machines 108, 110 and 112. The gameplay logic layer 706 may be able to receive requests from associated gameplay clients to start secondary games, join secondary games, decline to join secondary games, etc. The gameplay logic layer 706 may be able to inform multiple or all associated clients of the state of the secondary game as well as targeted responses to individual client requests. In some embodiments, the gameplay logic layer 706 may be able to handle the information of clients connecting, disconnecting, and rejoining a session in progress. The gameplay logic layer 706 of the administrator server may also pass along validated requests from gameplay clients to remote servers or devices. It may also receive streams of information from electronic gaming machines, such as electronic gaming machines 108, 110 and 112 and match them to player identifications that may be associated with player profiles, such as player profile 208 in the secondary game session. The gameplay logic layer 706 of the administrator server may also be configured to receive a list of gameplay and spectacle clients and initialize a secondary game. It may also inform the matchmaking server when the secondary game session has ended. The gameplay logic layer 706 may receive local requests from an administrator to affect the state of the secondary game and subsequently provide a response back to the administrator. It may also push the secondary game state or make the secondary game state available to the interface layer to provide diagnostic information.

In some embodiments, player inventories may be purchased, earned, or gifted from other players. For example, players may earn certain powerups through playing specific games online, through earned credits that may be obtained by online or other activity, or through playing the underlying primary game. In some embodiments, players may purchase powerups through a physical or online store. In some embodiments, players may obtain powerups through drawings, raffles, lotteries, or by simply joining a secondary game. For example, players joining a secondary game may all receive the same powerups, may be assigned powerups randomly or according to a formula, or may have to already have powerups in their inventory. In some embodiments, players joining a secondary game may receive a baseline set of powerups and may also use powerups already in their inventory.

The gameplay logic layer 706 of the gameplay client may be configured to store local copies of associated player's inventories as well as the game state. It may also pass input requests from the interface layer 702 to the network layer 710 and push responses from the network layer 710 to the interface layer 702. Gameplay logic layer 706 of the gameplay client may also include the design of a common user interface such as screen flow, messaging, etc. It may also be configured to refresh gameplay game state models and rejoin a secondary game. For example, the gameplay logic layer 706 may receive the function call via the network interface 708 from the network layer 710 as described above. The gameplay logic layer 706 will therefore receive the score updates for the players. As a result of the change in player scores, the gameplay logic layer 706 may call one or more functions via the common interface 704 to be displayed to the user, such as guest user 202. These functions may comprise a function to update the old scores with the new score and a function to indicate that one player has been overtaken by another.

The gameplay logic layer 706 of the spectacle client may be configured to interpret messages from the network layer 710 and send them to the interface layer 702. The gameplay logic layer 706 may also include the design of a common user interface, such as screen flow, messaging, etc.

The gameplay logic layer 706 of the matchmaking server may be configured to receive requests to start a secondary game from a gameplay client and attempt to find a suitable server to host the secondary game. It may also broadcast the beginning of a new secondary game to unconnected gameplay clients to enable them to attempt to join. The gameplay logic layer 706 may also receive requests to join a secondary game from a gameplay client and connect the gameplay client to the corresponding administrator server.

The player-facing cosmetics layer 702 also known as the interface layer 702 of associated devices, including one or more administrator servers, gameplay clients, spectacle clients, and matchmaking servers, may be configured to interpret events received through the common interface 704 from the gameplay logic layer 706 and provide an appropriate user interface or visual feedback. The interface layer 702 may be specific to the version of the game being developed and may be easily replaced with another implementation in order to create a game with a new visual interface and/or functions.

The interface layer 702 of the administrator server may be configured to show a functional array of inputs and outputs for the state of the secondary game as well as displaying administrator controls. For example, the interface layer 702 of the administrator server may be the administrator user interface 214 shown in FIG. 2.

The interface layer 702 of the gameplay client may show player information and an option to propose a secondary game when no secondary game is currently in session for that gameplay client. When a secondary game has been proposed, it may give players an opportunity to join or decline to join and may show how many other players are associated with the secondary game as well as a countdown to begin the secondary game. The interface layer 702 may also show a list of lobbies for joinable secondary games and allow a player to join a given secondary game. While in a secondary game, the interface layer 702 of the gameplay client may show the player's inventory as well as leaderboards and other messages.

The interface layer 702 of the spectacle client may be configured to show a splash screen when no secondary game is proposed or in session. When a secondary game has been proposed, the interface layer 702 may show the status of the player at the electronic gaming machine. During a secondary game, the interface layer 702 may show a curated feed based on setup parameters, such as which player it is following and what events are occurring in the secondary game.

The interface layer 702 of the matchmaking server may be configured to list all or some of the connected gameplay clients, spectacle clients, and administrator servers. It may also show the status of each of these devices including which secondary game each device is associated with.

For example, the interface layer 702 may receive the two function calls described above through the common interface 704. The interface layer 702 may then use the new scores to update leaderboard graphics. Additionally, the interface layer 702 may receive the indication that one player has been overtaken by another which may trigger a short spectacle cinematic in the graphics. It may also show administrator controls to attempt to have various clients and servers to connect with each other to resolve connection issues.

In another example, the interface layer 702 may receive data indicative of a status of a secondary game through the common interface 704, and trigger a hardware event (e.g., a spectacle client event) for physical feedback. For example, each spectacle client may include a lighting system, a fog machine, and/or other physical feedback devices and systems. In some embodiments, a digital multiplex (DMX) protocol and/or other protocols may be used for signaling and controlling physical feedback to the spectacle clients. By way of example, the interface layer 702 may receive the indication that a player wins the secondary game and output an DMX signal for lighting up a lighting system and/or control signals for discharging fog with a fog machine of the spectacle clients.

Figure 8A:
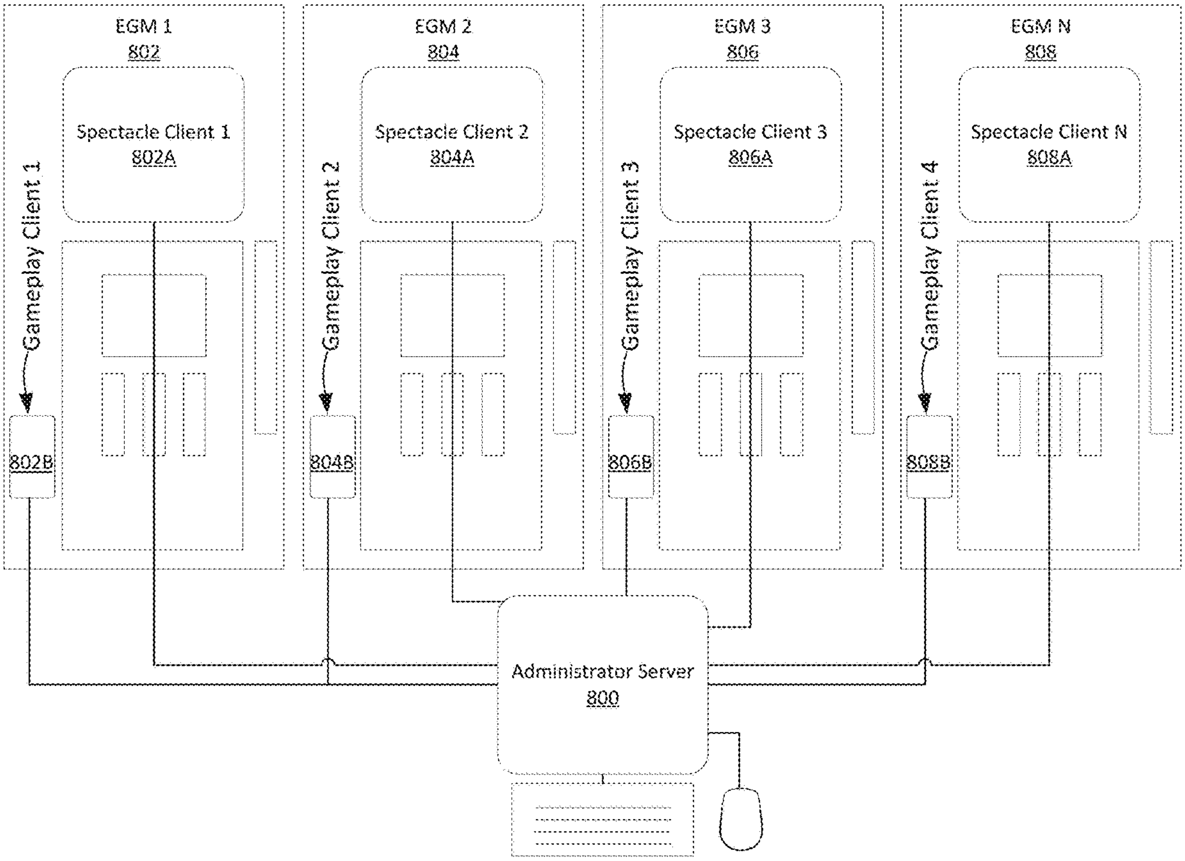
FIGS. 8A-8D illustrate example diagrams of interfacing between spectacle clients, gameplay clients, administrator servers, and matchmaking servers, consistent with embodiments of the disclosure.

FIG. 8A illustrates interfacing connections between spectacle clients 802A, 804A, 806A, and 808A, gameplay clients 802B, 804B, 806B, and 808B, and one or more administrator servers 800. The gameplay clients 802B, 804B, 806B, and 808B and spectacle clients 802A, 804A, 806A, and 808A of each electronic gaming machine 802, 804, 806, and 808 are connected to the administrator server 800 via a network. Once connection between all participating gameplay clients 802B, 804B, 806B, and 808B, spectacle clients 802A, 804A, 806A, and 808A, and administrator servers 800 is established all clients remain part of the singular server flow, even when no game is running or an individual machine is not included in that game. In order to have concurrent primary and secondary games, several aspects of the design and network are modified as described below.

In order to establish concurrent primary and secondary game, any number of electronic gaming machines 802, 804, 806, and 808 may be contained in a pool of available electronic gaming machines to participate in the secondary game. In some embodiments, the electronic gaming machines 802, 804, 806, and 808 in the pool may be installed in close physical proximity to each other. However, in other embodiments, the electronic gaming machines 802, 804, 806, and 808 in the pool need not be installed in close physical proximity and may be installed in different areas of a single location or even installed in different physical locations across cities, states, or even countries. The secondary game may also only have a single pool of available electronic gaming machines 802, 804, 806, and 808 to participate in the secondary game. Furthermore, one or more of the electronic gaming machines may be an online gaming machine.

In some embodiments, all of the electronic gaming machines 802, 804, 806, and 808, in the pool may participate together in the secondary game. However, in other embodiments, the pool of electronic gaming machines may be subdivided into smaller, separate secondary games containing at least two electronic gaming machines each.

In some embodiments, an electronic gaming machine in the pool not currently engaged in a secondary game may be able to start a new secondary game or join a secondary game which is currently accepting new players. When a secondary game finishes, all of the electronic gaming machines which were participating in the secondary game may return to their previous state of non-engagement and may individually start or seek out new secondary games.

In some embodiments, there may be lobby identification enabling a player with a choice of multiple secondary games to easily identify and join a specific secondary game. For example, a player may be able to join a secondary game that one of their friends is currently playing or preparing to play. In some embodiments, this lobby identification may simply be the names of players currently in the secondary game or other identifying information.

Figure 8B:
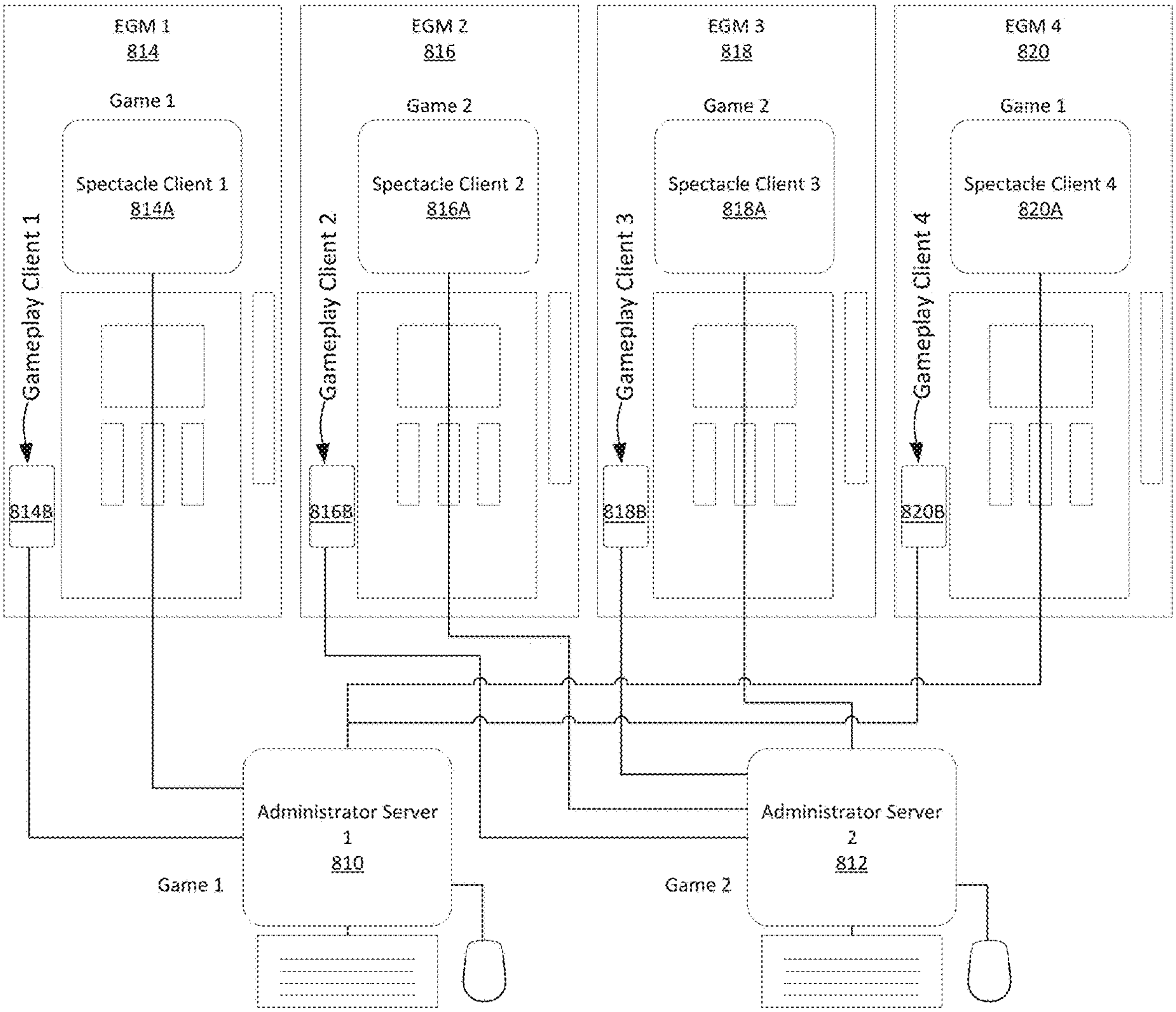

FIG. 8B illustrates an example interface between spectacle clients 814A, 816A, 818A, and 820A, gameplay clients 814B, 816B, 818B, and 820B, and administrator servers 810 and 812, consistent with embodiments of the present disclosure. Concurrent, unconnected secondary games may be running alongside each other using any combination of electronic gaming machines 814, 816, 818, and 820 in the pool. For example, as shown in FIG. 8B, electronic gaming machines one and four, 814 and 820, are participating in secondary game one connected to administrator server one 810. At the same time, however, electronic gaming machines two and three, 816 and 818, are participating in secondary game two connected to administrator server two 812. There may be any number of administrator servers established to allow the same number of secondary games. Individual administrator servers 810 and 812 may also allow multiple and concurrent separate groups of secondary games. Additionally, the administrator servers 810 and 812 may be able to frequently create and break connections, via a network, between each other in order to facilitate multiple concurrent secondary games as described above.

Figure 8C:
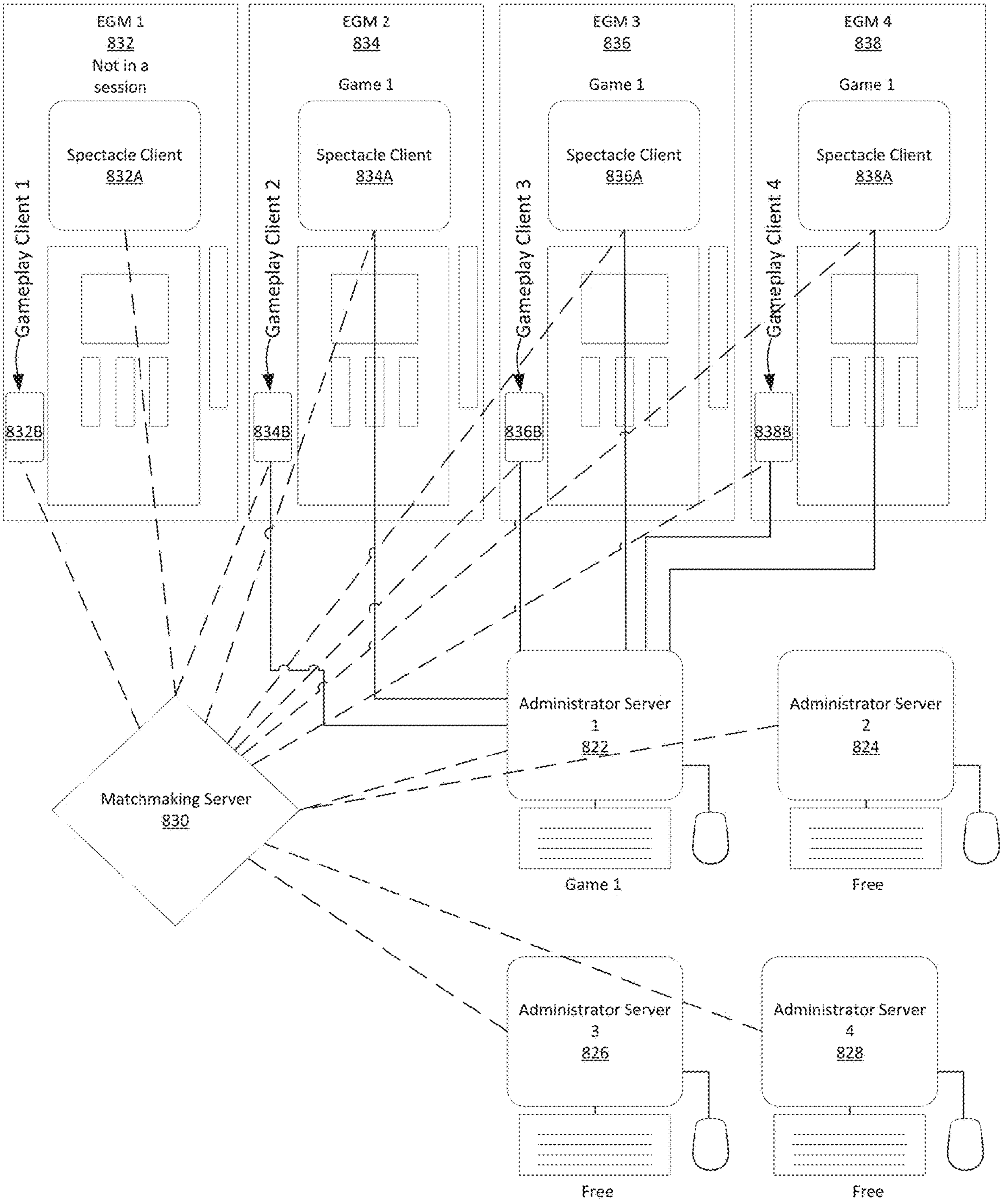

FIG. 8C illustrates an example interface between spectacle clients 832A, 834A, 836A, and 838A, gameplay clients 832B, 834B, 836B, and 838B, administrator servers 822,

824, 826, and 828, and matchmaking servers 830, consistent with embodiments of the present disclosure. As shown in FIG. 8C, the matchmaking server 830 may have a permanent connection to all or a subset of gameplay clients 832B, 834B, 836B, and 838B, spectacle clients 832A, 834A, 836A, and 838A, and administrator servers 822, 824, 826, and 828. The matchmaking server 830, therefore may be the first connection for a gameplay client, such as electronic gaming machine 832, not currently engaged in a secondary game which is seeking to start or join a secondary game. The matchmaking server 830 may initialize connections between an administrator server not currently hosting a secondary game, such as administrator servers 824, 826 and 828 and the electronic gaming machines of players looking to create or join a secondary game, such as electronic gaming machine 832. For example, the matchmaking server 830 may initialize two concurrent games into a setup such as the one depicted in FIG. 8B.

In some embodiments, the matchmaking server 830 may initialize connections for any number of new secondary games based on the number of electronic gaming machines not currently in a session, such as electronic gaming machine 832, and the number of available administrator servers, such as administrator server 824, 826, and 828. The matchmaking server 830 may initialize connections for communicating information associated with multiple secondary games concurrently and may thereafter take the connected electronic gaming machines, such as electronic gaming machine 832, and administrator server, such as administrator server 824, 826, and 828 participating in the secondary games out of the available pool. Once a secondary game finishes, the electronic gaming machines 832, 834, 836, and 838 and administrator server 822, 824, 826, and 828 associated with the secondary game are placed back into the pool and are available to join or host a new secondary game session.

Figure 8D:
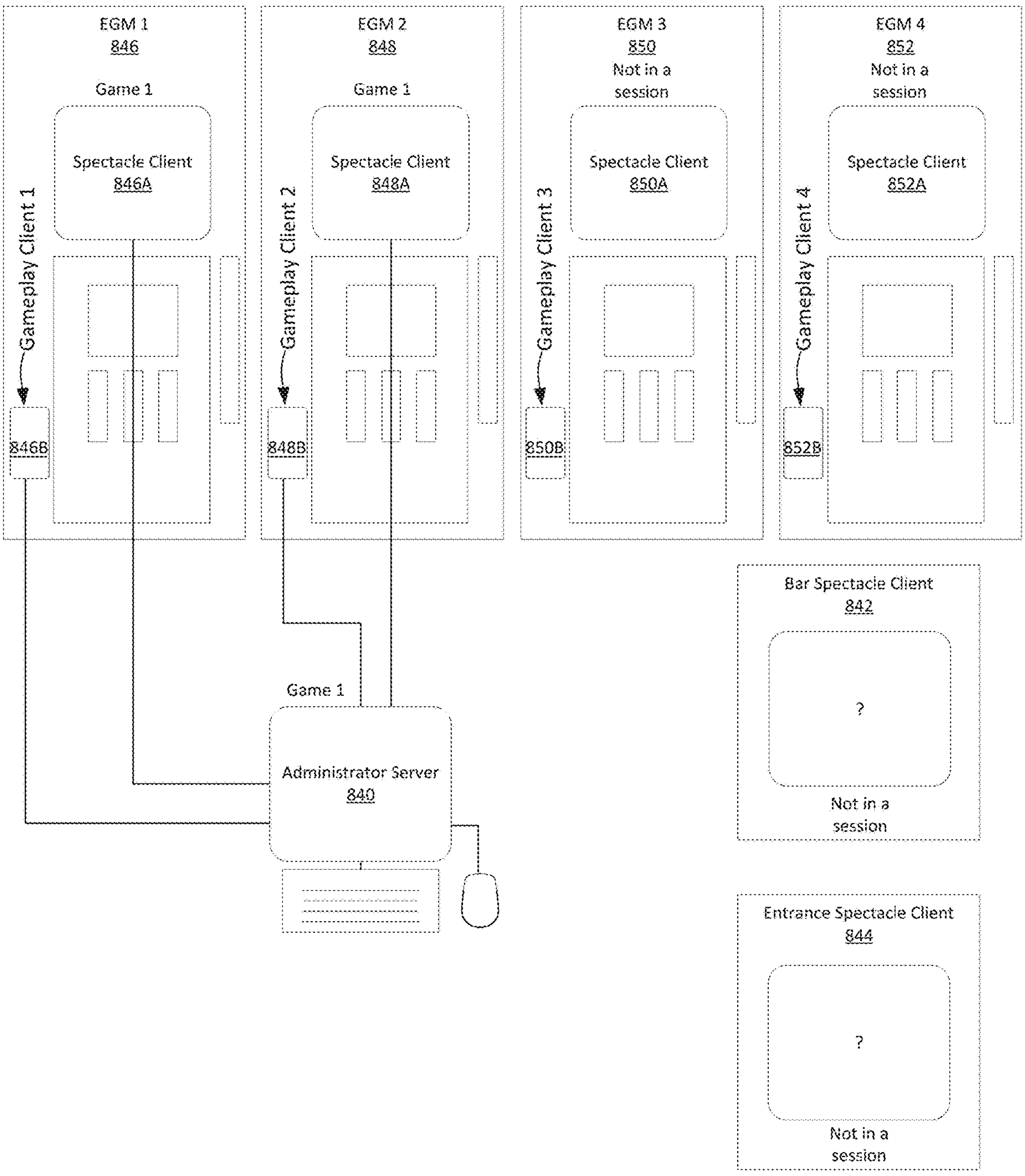

FIG. 8D illustrates an example interface between spectacle clients 846A, 848A, 850A, and 852A, gameplay clients 846B, 848B, 850B, and 852B, administrator servers 840, bar spectacle clients 842, and entrance spectacle clients 844, consistent with embodiments of the present disclosure. Spectacle clients 846A, 848A, 850A, and 852A, associated with a single gameplay client 846B, 848B, 850B, and 852B, and associated electronic gaming machine 846, 848, 850, and 852, may join the secondary game which the associated gameplay client joins and thereby display a feed dedicated to the player experience of the associated electronic gaming machine. In some embodiments, however, there may be spectacle clients such as spectacle clients 842 located at a bar (referred to as Bar Spectacle Client 842) and spectacle clients 844 located at the entrance to the facility (referred to as Entrance Spectacle Client 844) which may not be dedicated to single gameplay client or electronic gaming machine. These spectacle clients 842 and 844 are therefore also available in the pool of available clients to join a secondary game. As shown in FIG. 8D, these spectacle clients 842 and 844 may be free to join a secondary game or remain not in a session.

Embodiment of the present disclosure may be implemented through any suitable combination of hardware, software, and/or firmware. Modules and components of the present disclosure may be implemented with programmable instructions implemented by a hardware processor. In some embodiments, a non-transitory computer-readable storage medium including instructions is also provided, and the instructions may be executed by a processor device for performing the above-described steps and methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory. Examples of networks for supporting the herein described connections and communication of data feeds and information include private and public networks, including intranets, local area networks, and wide area networks (including the Internet). Such networks may include any combination of wired and wireless networks and support associated communication protocols.

It should be noted that, the relational terms herein such as “first” and “second” are used only to differentiate an entity or operation from another entity or operation, and do not require or imply any actual relationship or sequence between these entities or operations. Moreover, the words “comprising,” “having,” “containing,” and “including,” and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term “or” encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units. For example, there may be a single physical computer for the administrator server, the matching server, and other components.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A computer-implemented gaming system, comprising:
- a plurality of gaming machines associated with a plurality of players, each gaming machine being configured for primary gameplay and secondary gameplay;
- a scheduler configured to initiate a secondary game in response to a request from one of the plurality of players or a schedule defined by an administrator, the secondary game comprising one or more games executed on the plurality of gaming machines;
- a controller configured to:
  - validate one or more of the plurality of players to participate in the secondary game on respective ones of the plurality of gaming machines; and
  - enable the secondary gameplay to be performed concurrently with the primary gameplay by the validated players on the respective ones of the plurality of gaming machines, the secondary gameplay including user input for the secondary game, the user input being identified as part of secondary game player data and influencing at least one of a progression or position of a player of the secondary game; and
- a data analyzer configured to:
  - receive primary game player data concurrently with the secondary game player data from the plurality of gaming machines, the primary game player data comprising identification data and event-type data related to the primary game; and
  - determine the at least one of a progression or position of a player of the secondary game based at least in part on the received primary game player data for the primary game and the received secondary game player data associated with the user input for the secondary game.

2. The gaming system of claim 1, wherein each of the plurality of gaming machines includes a data feed that is received by the data analyzer, the data feed comprising the identification data and event-type data, wherein the data analyzer includes a parser to parse at least the identification data and the event-type data, and wherein the data analyzer includes a processor to process the parsed data to determine the at least one of a progression or position of a player of the secondary game.

3. The gaming system of claim 2, wherein the parsed data from each of the plurality of gaming machines includes at least one of primary game player data and secondary game player data.

4. The gaming system of claim 2, wherein the event-type data includes at least one of a game complete event representing that a primary game has been completed, a log-in event, or a log-out event.

5. The gaming system of claim 4, wherein the game-complete event is associated with data indicating a wage amount and an outcome of the primary game.

6. The gaming system of claim 5, wherein the data indicating the outcome of the primary game include a player's win amount, and wherein the processor is configured to multiply the player's win amount in the primary game by a score multiplier to determine the player's progression or position in the secondary game.

7. The gaming system of claim 1, wherein the primary game player data includes primary game scoring which is based on a player's performance in a primary game, and wherein the data analyzer is configured to process the primary game scoring to determine the player's progression or position in the secondary game.

8. The gaming system of claim 1, wherein the controller is configured to validate a player on one of the plurality of gaming machines based on a player profile.

9. The gaming system of claim 1, wherein the controller is further configured to present information for the secondary game on a video display associated with at least two of the plurality of gaming machines.

10. The gaming system of claim 1, wherein each of the plurality of gaming machines is configured to apply a powerup to alter the secondary game, wherein the powerup is based on at least one of a player profile of a validated player or the received secondary game player data associated with the user input for the secondary game.

11. The gaming system of claim 1, wherein the scheduler is configured to generate a start time and a stop time when initiating the secondary game.

12. The gaming system of claim 11, wherein the controller is further configured to regulate the data provided to or processed by the data analyzer based on the start time and stop time for the secondary game.

13. The gaming system of claim 11, wherein the data analyzer is controlled by the controller to not receive or process data before the start time and after the end time of the secondary game.

14. The gaming system of claim 1, wherein the scheduler is further configured to provide a graphical user interface to allow a user to set at least one of an option or rule for the secondary game.

15. The gaming system of claim 1, wherein the received primary game player data comprises data from at least two different primary games, each of the at least two different primary games being played concurrently by different players.

16. The gaming system of claim 15, wherein the at least two different primary games have at least one of different win rates, different probabilities of winning, or different scoring metrics.

17. A computer-implemented method for secondary game management, comprising the following steps implemented with at least one processor:
- initiating, with a scheduler, a secondary game in response to a request from one of a plurality of players or a schedule defined by an administrator, the secondary game comprising one or more games executed on a plurality of gaming machines associated with the plurality of players;
- validating, with a controller, one or more of the plurality of players to participate in the secondary game on respective ones of the plurality of gaming machines;
- enabling, with the controller, secondary gameplay to be performed concurrently with primary gameplay by the validated players on the respective ones of the plurality of gaming machines, the secondary gameplay including user input for the secondary game, the user input being identified as part of secondary game player data and influencing at least one of a progression or position of a player of the secondary game;
- receiving, with a data analyzer, primary game player data concurrently with the secondary game player data from the plurality of gaming machines, the primary game player data comprising identification data and event-type data related to the primary game; and determining, with the data analyzer, the at least one of a progression or position of a player of the secondary game based at least in part on the received primary game player data for the primary game and the received secondary game player data associated with the user input for the secondary game.

18. The method of claim 17, further comprising:

providing, from each of the plurality of gaming machines, a data feed to the data analyzer, the data feed comprising the identification data and event-type data;

parsing, with a parser of the data analyzer, at least two types of received data the identification data and the event-type data from the plurality of gaming machines; and processing, with a processor of the data analyzer, the parsed data to manage the secondary game.

19. The method of claim 18, wherein the parsed data from each of the plurality of gaming machines includes at least one of primary game player data and secondary game player data.

20. The method of claim 18, wherein the event-type data includes at least one of a game-complete event representing that a primary game has been completed, a log-in event, or a log-out event.

21. The method of claim 20, wherein the game-complete event is associated with data indicating a wage amount and an outcome of the primary game.

22. The method of claim 21, wherein the data indicating the outcome of the primary game include a player's win amount, and wherein the method further includes determining, with the processor of the data analyzer, the player's progression or position in the secondary game based on the multiplication of the player's win amount in the primary game by a score multiplier.

23. The method of claim 17, wherein the primary game player data includes primary game scoring which is based on a player's performance in a primary game, and wherein the method further includes processing, with the data analyzer, the primary game scoring to determine the player's progression or position in the secondary game.

24. The method of claim 17, further including:

applying a powerup to alter the secondary game, wherein the powerup is based on at least one of a player profile of a validated player or the received secondary game player data associated with the user input for the secondary game.

25. The method of claim 17, further including:

regulating the data provided to or processed by the data analyzer based on a start time and a stop time associated with the secondary game.

* * * * *